US012293731B2

(12) United States Patent
Gao et al.

(10) Patent No.: US 12,293,731 B2
(45) Date of Patent: May 6, 2025

(54) EMISSION PROFILE TRACKING FOR ELECTRONIC DISPLAYS

(71) Applicant: Apple Inc., Cupertino, CA (US)

(72) Inventors: Shengkui Gao, Shoreline, WA (US); Jie Won Ryu, Santa Clara, CA (US); Kingsuk Brahma, Mountain View, CA (US); Marc J DeVincentis, Palo Alto, CA (US); Mohammad Ali Jangda, Santa Clara, CA (US); Paolo Sacchetto, Cupertino, CA (US); Weijun Yao, Saratoga, CA (US); Yafei Bi, Los Altos Hills, CA (US); Yang Xu, San Jose, CA (US); Yue Jack Chu, Cupertino, CA (US); Zhe Hua, San Jose, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 17/988,721

(22) Filed: Nov. 16, 2022

(65) Prior Publication Data

US 2023/0197020 A1 Jun. 22, 2023

Related U.S. Application Data

(60) Provisional application No. 63/291,111, filed on Dec. 17, 2021.

(51) Int. Cl.
*G09G 3/34* (2006.01)
*G09G 3/20* (2006.01)
(Continued)

(52) U.S. Cl.
CPC ......... *G09G 3/3426* (2013.01); *G09G 3/3611* (2013.01); *G09G 2330/021* (2013.01); *G09G 2360/16* (2013.01)

(58) Field of Classification Search
None
See application file for complete search history.

(56) References Cited

U.S. PATENT DOCUMENTS 5,574,764 A * 11/1996 Granfors .................. H05G 1/60 378/98.7
6,803,897 B2 * 10/2004 Smith .................. G09G 3/3674 345/98
(Continued)

FOREIGN PATENT DOCUMENTS

JP 4519493 B2 8/2010

*Primary Examiner* — Patrick N Edouard
*Assistant Examiner* — Peijie Shen
(74) *Attorney, Agent, or Firm* — Fletcher Yoder, P.C.

(57) ABSTRACT

This disclosure provide various techniques for tracking emission profiles on an electronic display. An emission profile may be applied to the electronic display in order to illuminate certain pixels and deactivate (e.g., turn off) certain pixels in the electronic display to facilitate refreshing (e.g., programming with new image data) the deactivated pixels. A real-time row-based average pixel level or average pixel luminance calculation architecture may track the one or more EM profiles to accurately model EM profile behavior, which may enable accurate calculation of the average pixel level or average pixel luminance of the electronic display at any one point in time. The accurate average pixel level or average pixel luminance calculations effectuated by the EM profile tracking may be used to reduce the IR drop, improve real-time peak-luminance control, and improve the performance of under-display sensors, among other advantages.

20 Claims, 22 Drawing Sheets

(51) Int. Cl.
*G09G 3/3208* (2016.01)
*G09G 3/36* (2006.01)

(56) References Cited

U.S. PATENT DOCUMENTS 8,217,865 B2 * 7/2012 Tada .................... G09G 3/3233 345/82
9,355,614 B2 * 5/2016 Kim ...................... G06T 11/001
9,966,012 B2 5/2018 Hoshino
10,313,645 B1 * 6/2019 Held .................. G02B 27/0172
10,803,778 B1 * 10/2020 Pande ...................... G09G 3/20
2008/0291136 A1 * 11/2008 Inoue ....................... G09G 3/30 348/E5.062
2008/0292207 A1 * 11/2008 Kang ........................ G06T 5/94 382/274
2008/0309811 A1 * 12/2008 Fujinawa ............. H04N 23/675 348/E5.022
2009/0058836 A1 * 3/2009 Kang ....................... G09G 3/22 345/204
2009/0135304 A1 * 5/2009 Inoue ..................... G09G 5/006 348/712
2009/0315923 A1 * 12/2009 Qiao ....................... G06F 3/147 345/698
2010/0188433 A1 * 7/2010 Hiramatsu ............. G09G 3/342 345/690
2011/0205442 A1 * 8/2011 Mori .................... G09G 3/3208 348/673
2011/0227966 A1 * 9/2011 Mori ........................ H04N 9/68 345/690
2012/0218255 A1 * 8/2012 Tsuchida .............. H04N 13/305 345/419
2012/0229430 A1 * 9/2012 Ward ................... H04N 9/3182 345/204
2013/0300772 A1 * 11/2013 Kim ......................... G09G 5/02 345/589
2014/0198134 A1 * 7/2014 Moon ...................... G09G 3/20 345/87
2015/0161941 A1 * 6/2015 Lim ..................... G09G 3/3208 345/691
2015/0187259 A1 * 7/2015 Jeong ................... G09G 3/3233 345/690
2015/0302789 A1 * 10/2015 Furihata ............... G09G 3/2007 345/694
2016/0189619 A1 * 6/2016 Park ..................... G09G 3/3233 345/77
2016/0217745 A1 * 7/2016 Park ..................... G09G 3/2003
2017/0032732 A1 * 2/2017 Lee ...................... H04N 1/6005
2020/0035176 A1 * 1/2020 Ohhara ................ G09G 3/3648
2020/0219464 A1 * 7/2020 Callway .................. G06F 3/013
2021/0183321 A1 6/2021 Pyo
2021/0201723 A1 * 7/2021 Choi .................... G09G 3/3233
2021/0304703 A1 * 9/2021 Xu ........................... G09G 5/10
2022/0189006 A1 * 6/2022 Munoz Delgado .... G06N 3/045
2022/0285473 A1 * 9/2022 Yu .......................... H10K 30/82
2022/0301145 A1 * 9/2022 Wang .................... G06T 15/205
2023/0089942 A1 * 3/2023 Shi ....................... G09G 3/2007 345/690
2023/0419911 A1 * 12/2023 Huang ................. G09G 3/2096

* cited by examiner

EMISSION PROFILE TRACKING FOR ELECTRONIC DISPLAYS

CROSS-REFERENCE TO RELATED APPLICATIONS

This application claims priority to U.S. Provisional Application No. 63/291,111, filed Dec. 17, 2021, entitled "EMISSION PROFILE TRACKING FOR ELECTRONIC DISPLAYS," the disclosure of which is incorporated by reference in its entirety for all purposes.

SUMMARY

This disclosure relates to systems and methods for tracking pulses and/or emission masks of an emission profile of an electronic display.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

An emission profile may be applied to the electronic display to illuminate certain pixels and deactivate (e.g., turn off) certain pixels from emitting light in the electronic display. The emission profile may also be referred to as an "EM profile," "pixel mask," or "emission mask." Over time, the emission profile may shift such that the emission profile illuminates certain other pixels and deactivates certain other pixels. The emission profile may include any appropriate number of pulses per image frame (e.g., 1 pulse, 2 pulses, 4 pulses, 10 pulses, and so on), may include a variety of shapes of pulses (e.g., evenly spaced horizontal pulses, evenly spaced vertical pulses, unevenly spaced diagonal pulses, and so on), and may include pulses of various pulse-widths based on a variety of factors, such as which application is being displayed on the electronic display, whether the end of an old frame or the beginning of a new frame is displayed on the electronic display, and so on. As such, different emission profiles may change per-application, per-frame, or both. The different emission profiles may result in a variation in the average pixel level or average pixel luminance of image data to be displayed on the electronic display. As used herein, average pixel level may be combined with a display brightness value (DBV)—representing a global display brightness setting for the electronic display—to produce an average pixel luminance. Although these two types of values may be referred to in different contexts as "APL" and are not exactly the same, depending on the use case, the system may use average pixel level or average pixel luminance of the electronic display to adjust image data or the operation of the electronic display.

A real-time row-based calculation architecture may track the one or more EM profiles to accurately model EM profile behavior, which may enable accurate calculation of the average pixel level or the average pixel luminance of the electronic display at any one point in time. The accurate calculations effectuated by the EM profile tracking may be used to reduce the IR drop, improve real-time peak-luminance control, and improve the performance of under-display sensors, among other advantages.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
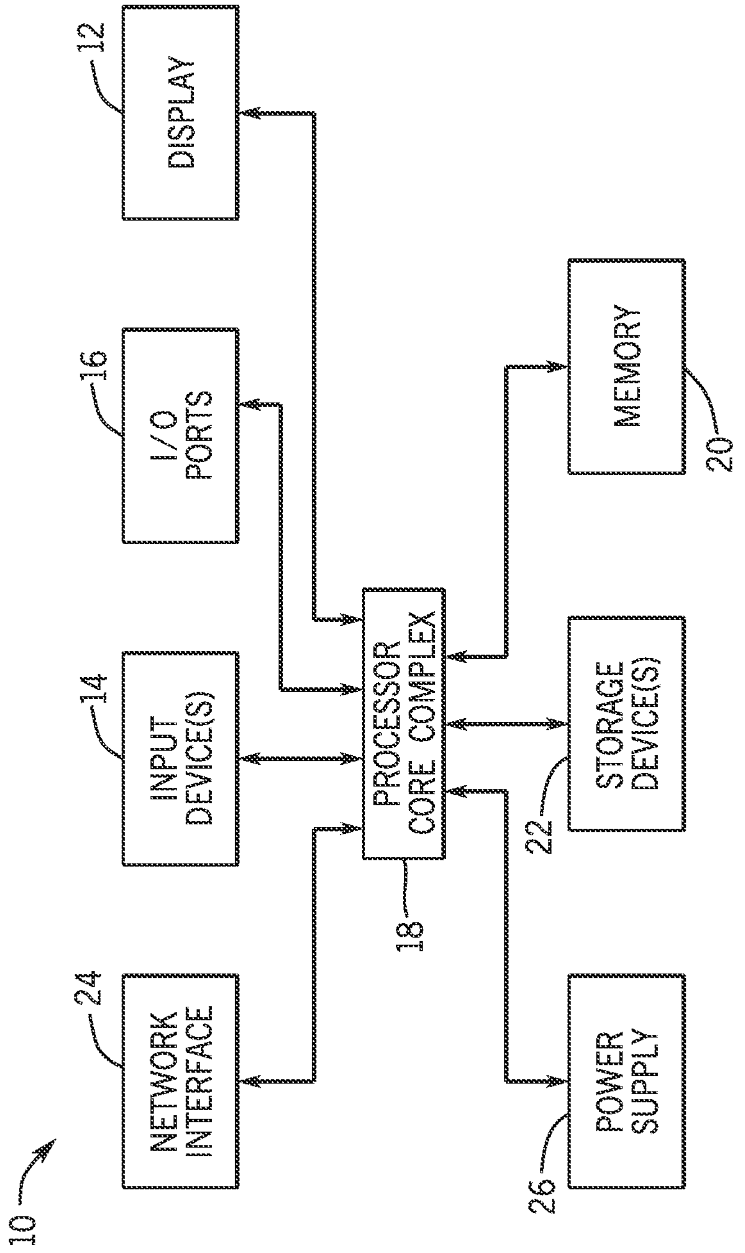
FIG. 1 is a block diagram of an electronic device having an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

An emission profile may be applied to the electronic display in order to illuminate certain pixels and deactivate (e.g., turn off) certain pixels in the electronic display. The emission profile may also be referred to as an "EM profile," "pixel mask," or "emission mask." The emission profile may shift such that the emission profile illuminates certain other pixels and deactivates certain other pixels. The emission profile may include any appropriate number of pulses (e.g., 1 pulse, 2 pulses, 4 pulses, 10 pulses, and so on), may include a variety of shapes of pulses (e.g., evenly spaced horizontal pulses, evenly spaced vertical pulses, unevenly spaced diagonal pulses, and so on), and may include pulses of various pulse-widths based on a variety of factors, such as which application is being displayed on the electronic display, whether the end of an old frame or the beginning of a new frame is displayed on the electronic display, and so on. As such, different emission profiles may change per-application, per-frame, or both. The different emission profiles may result in a variation in the average pixel level or average pixel luminance of image data to be displayed on the electronic display. As used herein, average pixel level may be combined with a display brightness value (DBV)—representing a display brightness setting for the electronic display—to produce an average pixel luminance of the electronic display. Although these two types of values may be referred to in different contexts as "APL" and are not exactly the same, depending on the use case, the system may use average pixel level or average pixel luminance of the electronic display to adjust image data or the operation of the electronic display.

A real-time row-based calculation architecture may track the one or more EM profiles to accurately model EM profile behavior, which may enable accurate calculation of the average pixel level or the average pixel luminance of the electronic display at any one point in time. The accurate calculations effectuated by the EM profile tracking may be used to reduce the IR drop, improve real-time peak-luminance control, and improve the performance of under-display sensors, among other advantages.

With this in mind, an example of an electronic device 10, which includes an electronic display 12 that may benefit from these features, is shown in FIG. 1. FIG. 1 is a schematic block diagram of the electronic device 10. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a wearable device, a watch, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a fourth-generation wireless network (4G), LTE, or fifth-generation wireless network (5G), or the like. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12, as described further herein. The touch sensing components may receive user inputs by detecting occurrence and/or position of an object contacting the display surface of the electronic display 12.

In addition to enabling user inputs, the electronic display 12 may provide visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for a red-green-blue (RGB) pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22. Additionally, in some embodiments, image data may be received from another electronic device 10, for example, via the network interface 24 and/or an I/O port 16.

Figure 2:
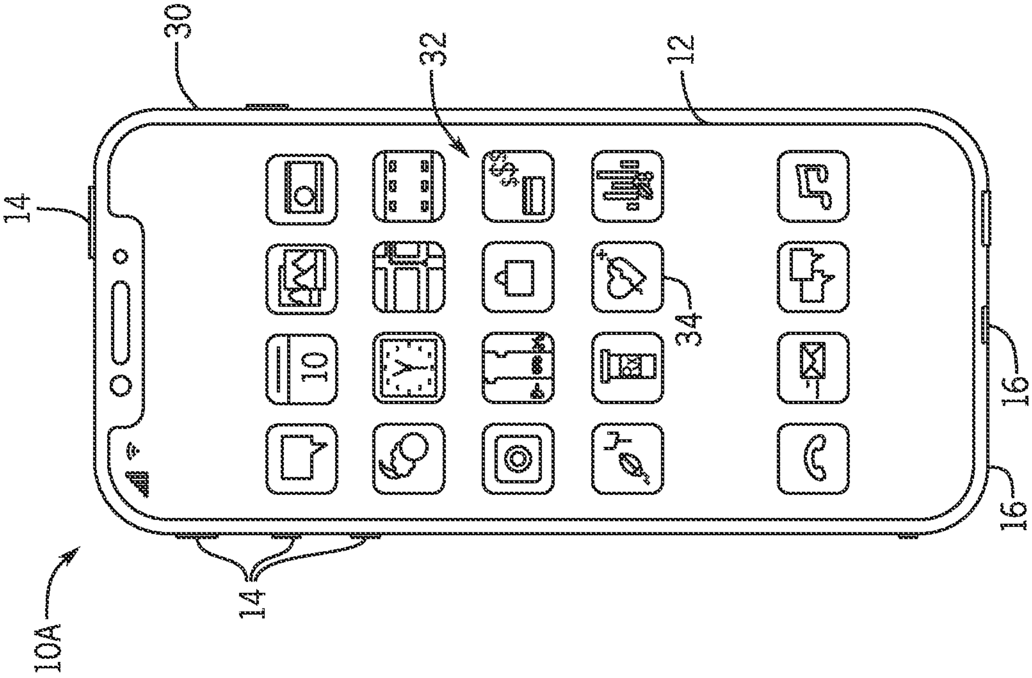
FIG. 2 is an example of the electronic device in the form of a handheld device, in accordance with an embodiment.

One example of the electronic device 10, specifically a handheld device 10A, is shown in FIG. 2. FIG. 2 is a front view of the handheld device 10A representing an example of the electronic device 10. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference. In the depicted embodiment, the electronic display 12 is displaying a graphical user interface (GUI) 32 having an array of icons 34. By way of example, when an icon 34 is selected either by an input device 14 or a touch sensing component of the electronic display 12, an application program may launch.

Input devices 14 may be provided through the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 30. The I/O ports 16 may include, for example, a Lightning® or Universal Serial Bus (USB) port.

Figure 3:
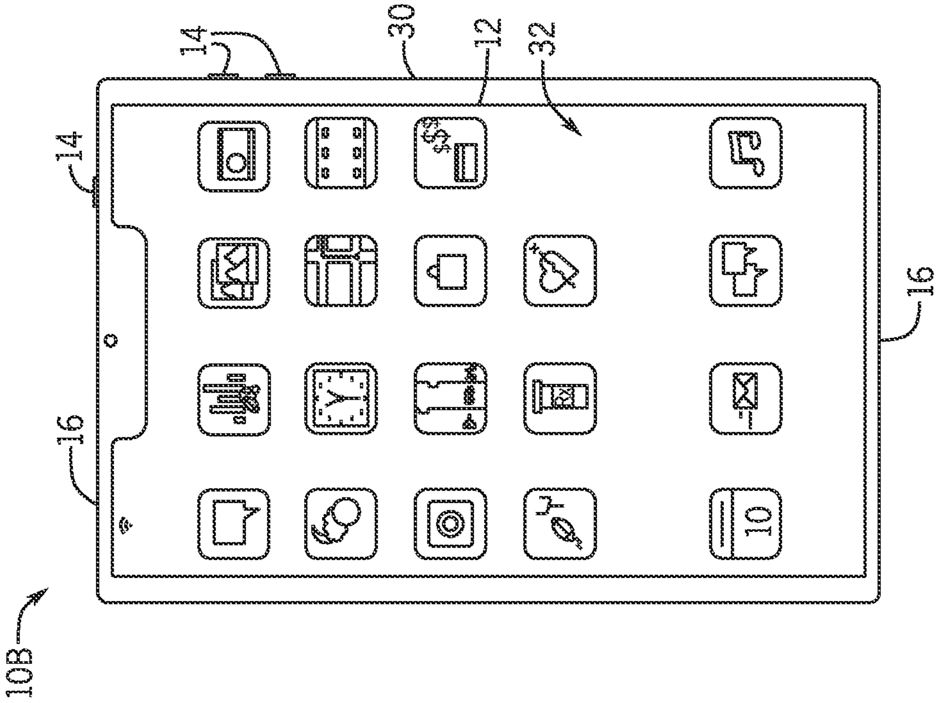
FIG. 3 is an example of the electronic device in the form of a tablet device, in accordance with an embodiment.
Figure 4:
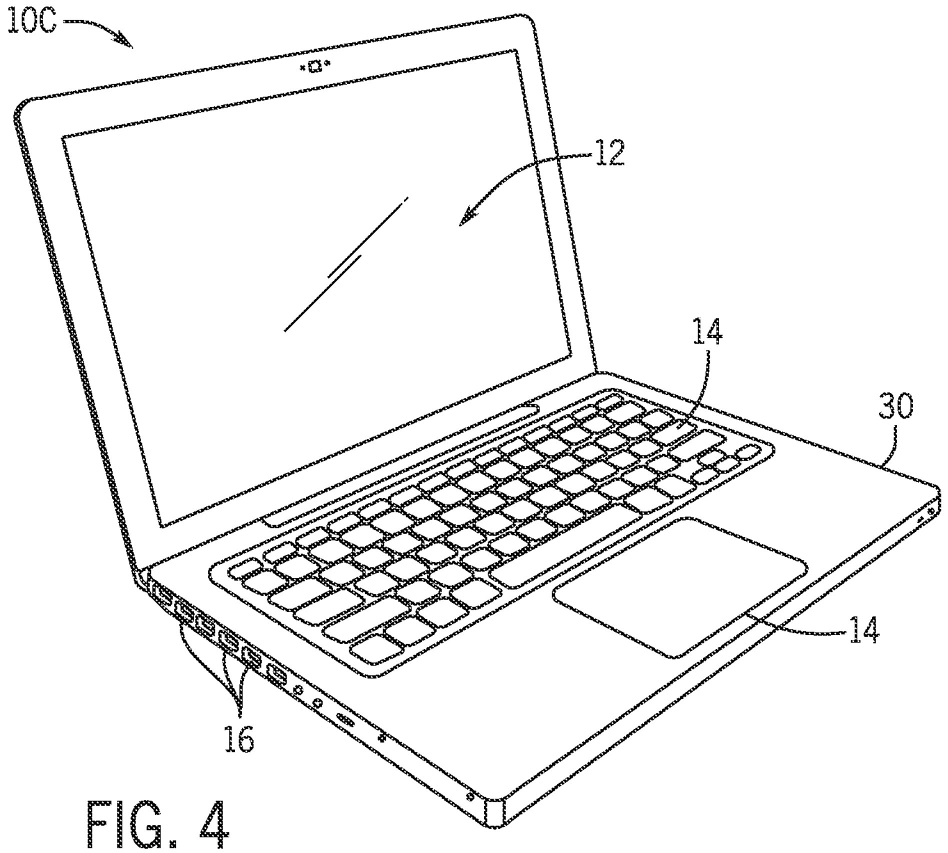
FIG. 4 is an example of the electronic device in the form of a notebook computer, in accordance with an embodiment.
Figure 5:
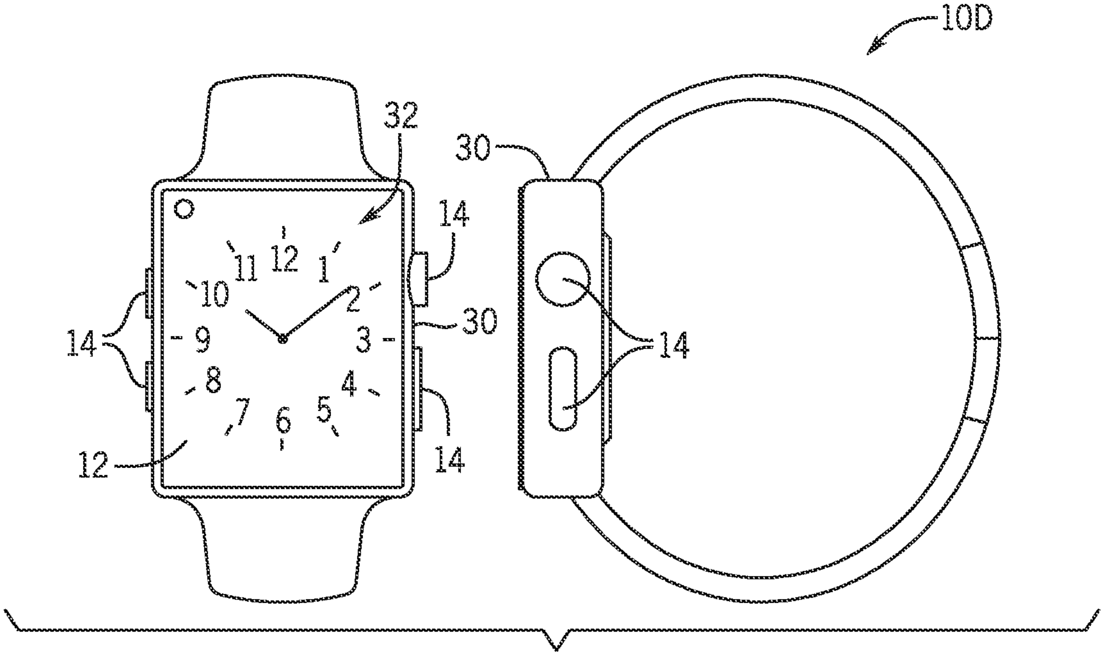
FIG. 5 is an example of the electronic device in the form of a wearable device, in accordance with an embodiment.

The electronic device 10 may take the form of a tablet device 10B, as shown in FIG. 3. FIG. 3 is a front view of the tablet device 10B representing an example of the electronic device 10. By way of example, the tablet device 10B may be any iPad® model available from Apple Inc. A further example of a suitable electronic device 10, specifically a computer 10C, is shown in FIG. 4. FIG. 4 is a front view of the computer 10C representing an example of the electronic device 10. By way of example, the computer 10C may be any MacBook® or iMac® model available from Apple Inc. Another example of a suitable electronic device 10, specifically a watch 10D, is shown in FIG. 5. FIG. 5 are front and side views of the watch 10D representing an example of the electronic device. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 30.

Figure 6:
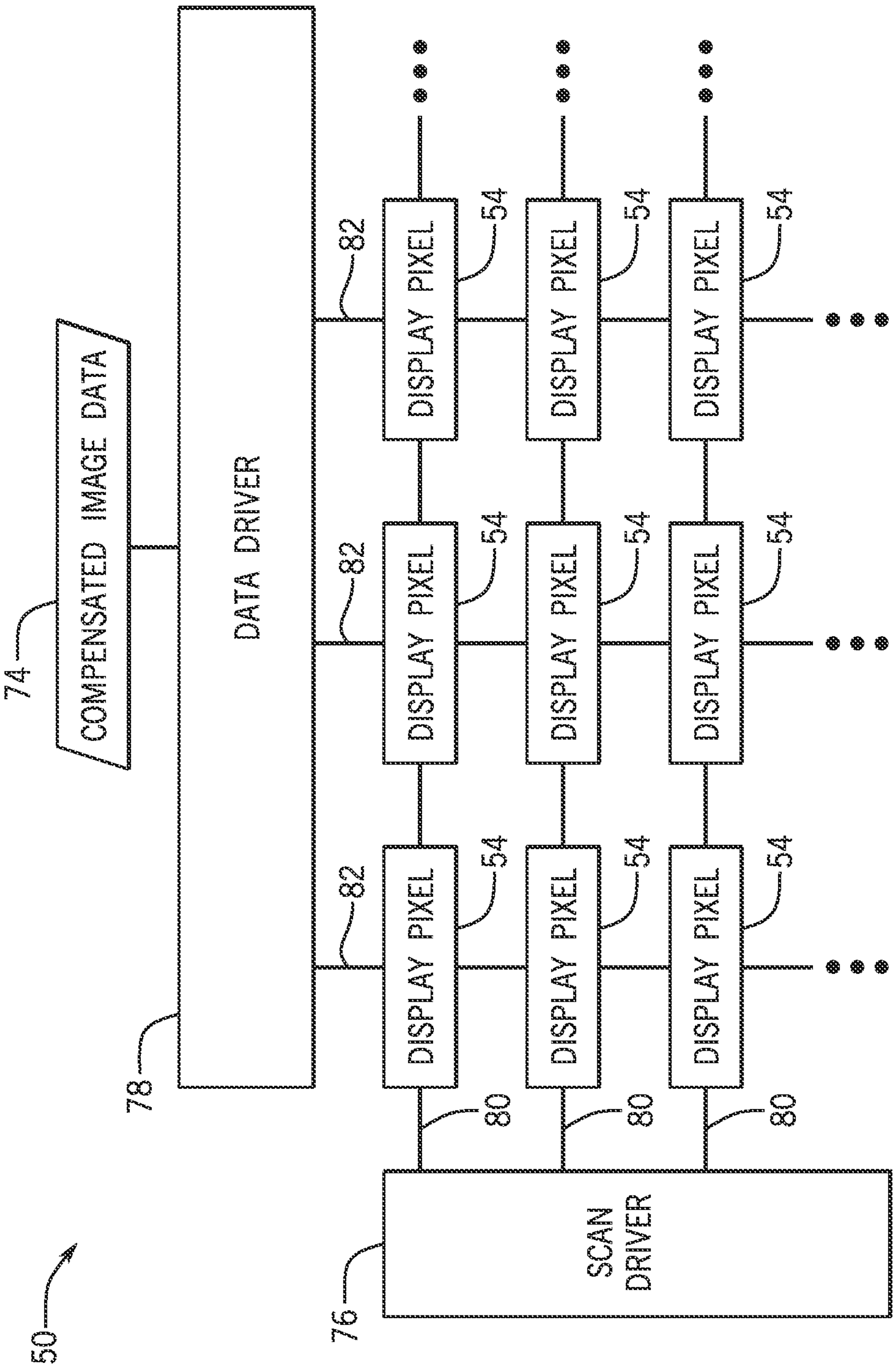
FIG. 6 is a block diagram of the electronic display, in accordance with an embodiment.

FIG. 6 is a block diagram of a display pixel array 50 of the electronic display 12. It should be understood that, in an actual implementation, additional or fewer components may be included in the display pixel array 50. The electronic display 12 may receive any suitable image data (e.g., compensated image data 74) for presentation on the electronic display 12. The compensated image data 74 is referred to as compensated because it may have been processed to account for specific operational variations (e.g., to avoid exceeding a threshold value of average pixel level or average pixel luminance) in the electronic display 12. The electronic display 12 includes display driver circuitry that includes scan driver circuitry 76 and data driver circuitry 78. The display driver circuitry controls programing the compensated image data 74 into the display pixels 54 for presentation of an image frame via light emitted according to each respective bit of compensated image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)); however, other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use red (R), green (G), blue (B), or others.

The scan driver circuitry 76 may provide scan signals (e.g., pixel reset, data enable, on-bias stress, emission (EM)) on scan lines 80 to control the display pixels 54 by row. For example, the scan driver circuitry 76 may cause a row of the display pixels 54 to become enabled to receive a portion of the compensated image data 74 from data lines 82 from the data driver circuitry 78. In this way, an image frame of the compensated image data 74 may be programmed onto the display pixels 54 row by row. Other examples of the electronic display 12 may program the display pixels 54 in groups other than by row. When the scan driver circuitry 76 provides an emission signal to certain pixels 54, those pixels 54 may emit light according to the compensated image data 74 with which those pixels 54 were programmed. The pattern by which the emission signal is provided to the pixels 54 may be based on an emission profile.

Figure 8:
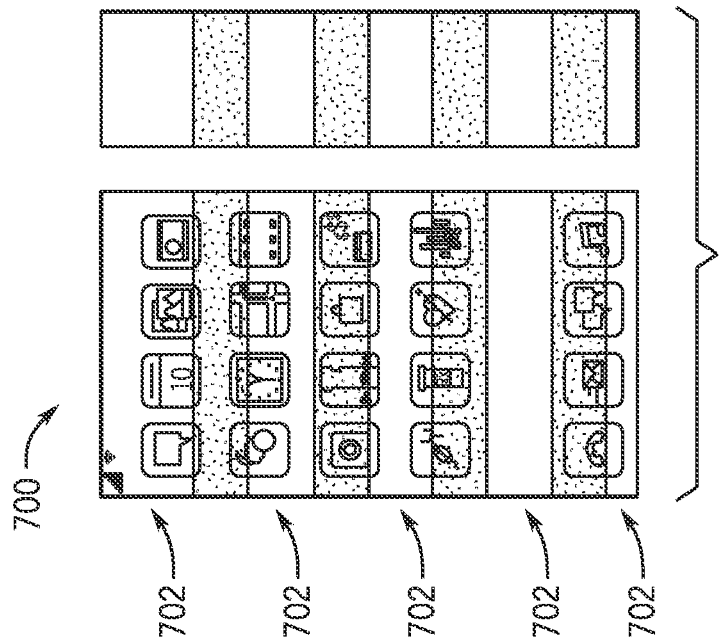
FIG. 8 is an illustration of the emission profile of FIG. 7 after the emission profile has shifted, in accordance with an embodiment.
Figure 7:
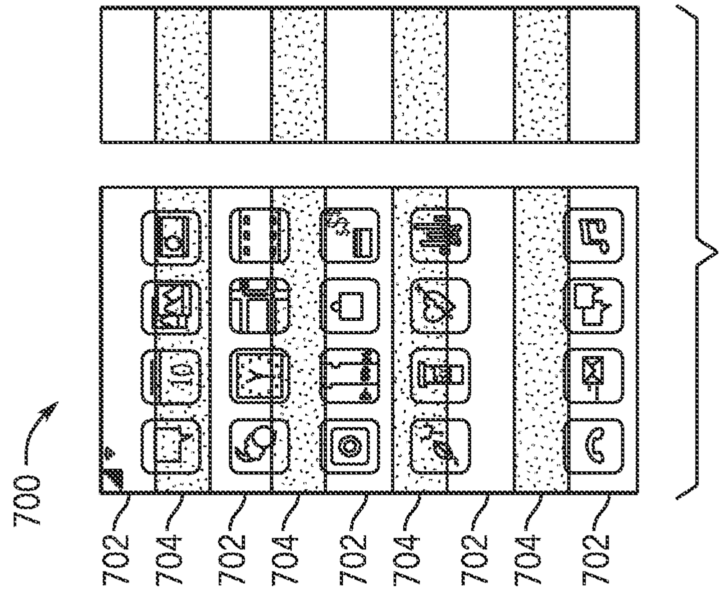
FIG. 7 is an illustration of an emission profile implemented on the electronic device of FIG. 1, in accordance with an embodiment.

FIG. 7 is an illustration of an emission profile 700 that may be implemented on the electronic display 12 of the electronic device 10, according to an embodiment of the present disclosure. As previously discussed, the emission profile 700 may be applied to the electronic display 12 in order to illuminate (e.g., based on emission pulses 702) certain pixels (e.g., a pixel or group of pixels of the display pixels 54) and deactivate (e.g., turn off) certain other display pixels 54 in the electronic display 12. The emission profile 700 may shift over time such that the emission profile 700 illuminates certain other pixels and deactivates certain other pixels. FIG. 8 is an illustration of the emission profile 700 after the emission profile 700 has shifted to illuminate additional rows of display pixels 54. As previously stated, an emission profile may include any appropriate number of pulses (e.g., 1 pulse, 2 pulses, 4 pulses, 10 pulses, and so on), may include a variety of shapes of pulses (e.g., evenly spaced horizontal pulses, evenly spaced vertical pulses, unevenly spaced diagonal pulses, and so on), and may include pulses of various pulse-widths based on a variety of factors, such as which application is being displayed on the electronic display, whether the end of an old frame or the beginning of a new frame is displayed on the electronic display, and so on. As such, different EM profiles may change per-application, per-frame, or both. The different EM profiles may result in a variation in the average pixel level and/or average pixel luminance of image data to be displayed on the electronic display.

Figure 9:
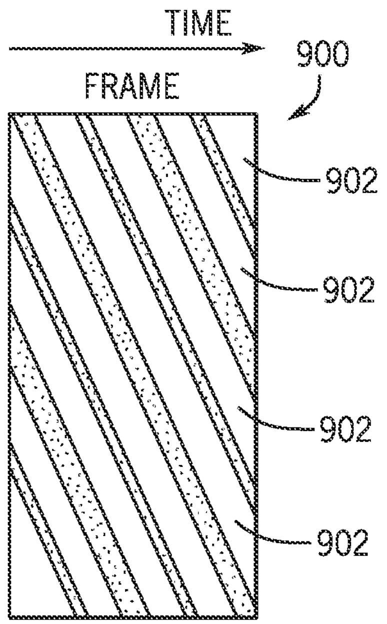
FIG. 9 is an illustration of a non-uniform emission profile implemented on the electronic display of an electronic device, in accordance with an embodiment.

FIG. 9 is an illustration of a non-uniform emission profile 900 implemented on the electronic display 12 of an electronic device (e.g., the electronic device 10), according to an embodiment of the present disclosure. As previously stated, an application running on the electronic device 10 may determine the characteristics of the emission profile, such as the shape of the emission pulses, the number of emission pulses, the uniformity of the emission pulses, and so on. An application using intermediate frame pause (IFP) may effectuate a non-uniform emission profile such as the non-uniform emission profile 900. Applications that use IFP may include certain fine-grain touch-sensitive applications, such as applications using drawings or writing with a stylus. Emission profile tracking in applications that use IFP may enable accurate tracking of panel content loading and may reduce or avoid altogether front-of-screen interaction with and without stylus operation.

Figure 10:
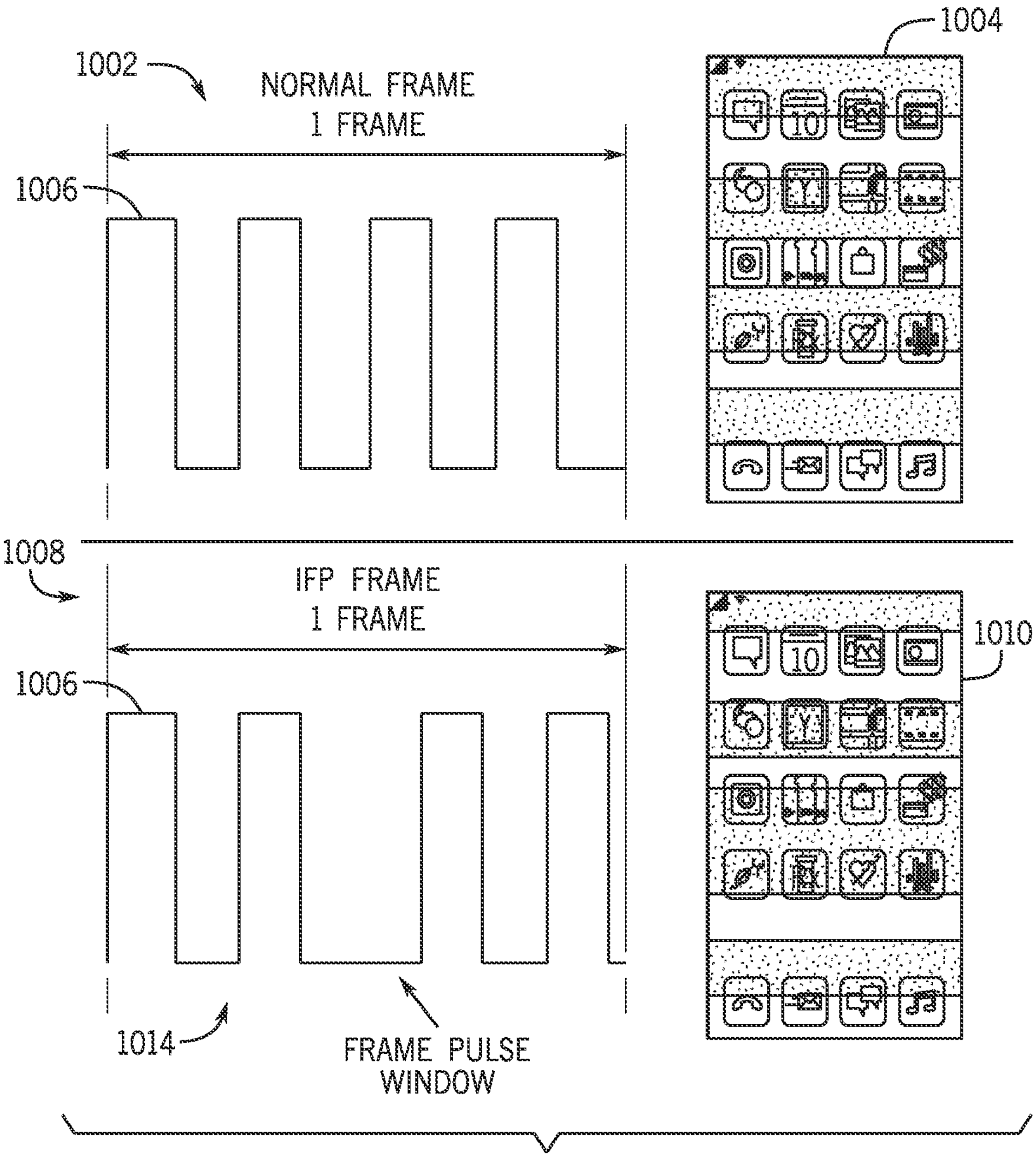
FIG. 10 is a diagram illustrating an emission profile in a normal frame and the emission profile in an intraframe pause (IFP) frame that includes an intraframe pause, in accordance with an embodiment.

FIG. 10 is a diagram illustrating the emission profile in a normal frame (e.g., 1002) and the emission profile in an IFP frame (e.g., 1008), according to an embodiment of the present disclosure. As previously discussed, the emission profile may vary by application or may even vary frame-by-frame. The variation of the emission profile with IFP operation may affect panel content loading. The normal frame 1002 may have a normal emission profile 1004. The normal emission profile 1004 may include four pulses 1006 per frame. The IFP frame 1008 may have an IFP emission profile 1010, which may likewise include four pulses 1006 per frame. Due to the variation in panel content loading, the IFP emission profile 1010 may only update certain emission pulses (e.g., may only update every third or fourth emission pulse 702). As such, a frame pulse window 1014 may be inserted into the IFP emission profile 1010. The frame pulse window 1014 may be used by an operating system or application of the electronic device 10 to perform any suitable task that benefits from a lack of illumination in the area of the electronic display 12 corresponding to the frame pulse window 1014. For example, the operating system or an application of the electronic device may perform lower-noise touch sensing in the area of the electronic display 12 corresponding to the frame pulse window 1014. Indeed, by tracking the frame pulse window 1014, any tasks that benefit from a lack of illumination may be performed on the portion of the electronic display 12 that is not currently illuminated. These tasks may include, for example, touch sensing (e.g., for a finger or stylus) or under-display light sensing (e.g., using an ambient light sensor, proximity sensor, or camera).

Figure 11:
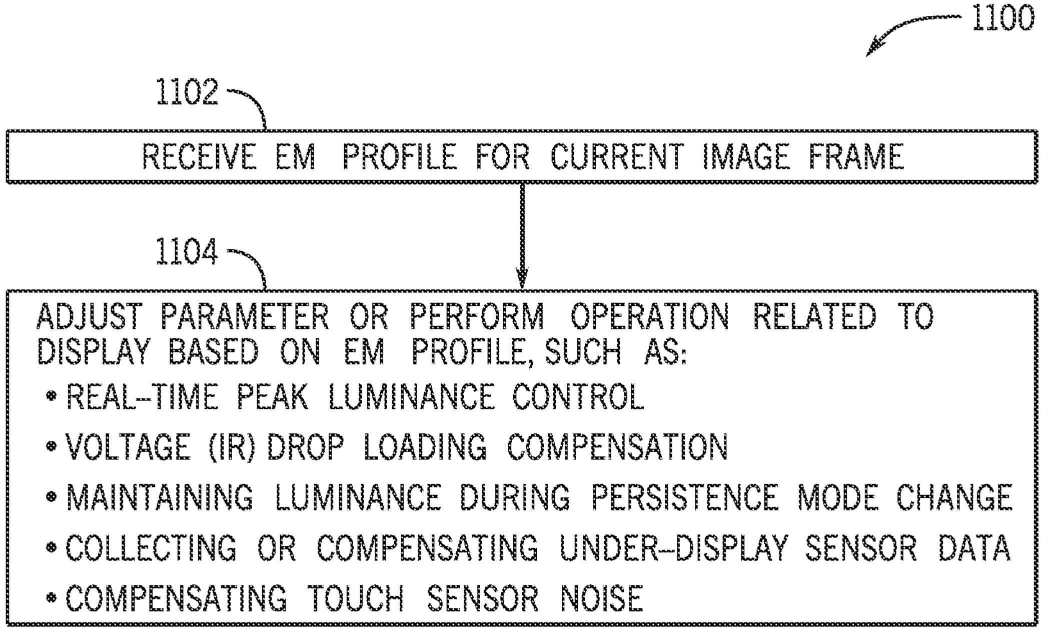
FIG. 11 is a flowchart of a method for receiving and tracking the emission profile of FIG. 7, in accordance with an embodiment.

FIG. 11 is a flowchart of a method 1100 for receiving and tracking an emission profile (e.g., the emission profile 700), according to an embodiment of the present disclosure. In process block 1102, the electronic device 10 (e.g., the processor core complex 18 of the electronic device 10) receives the emission profile for a current image frame to be displayed on the electronic display 12. Based on the characteristics of the emission profile (e.g., shape of emission pulses, number of emission pulses, and so on), in process block 1104 the processor core complex 18 may adjust certain operating parameters of the electronic device 10 or perform operations related to the electronic display 12 based on the emission profile. These operating parameters and/or operations may include, but are not limited to peak luminance control (e.g., real-time peak luminance control); voltage (IR) drop loading compensation; maintaining luminance during persistence mode change; collecting (or compensating for noise in) under-display sensor data; and collecting (or compensating for noise) in touch sensor data. Each of these operating parameters and/or operations will be discussed in greater detail in the following sections.

Emission Tracking to Determine Average Pixel Level or Average Pixel Luminance

Figure 12:
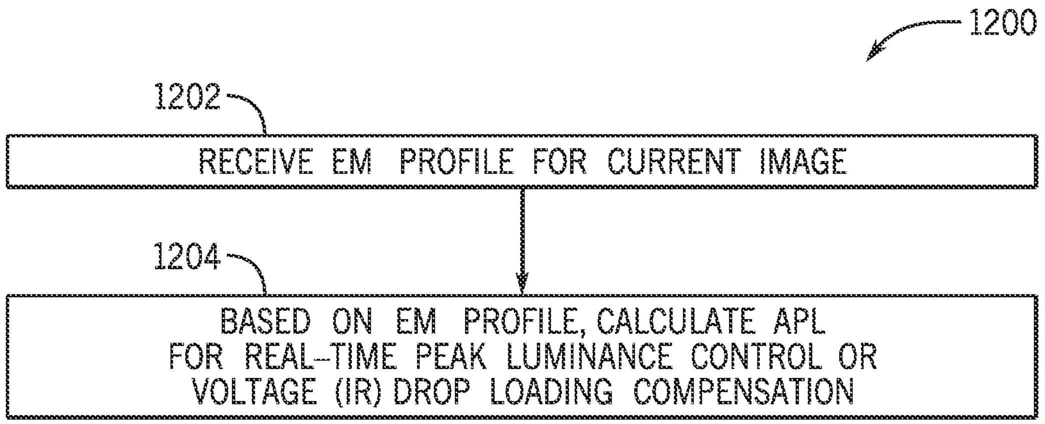
FIG. 12 is a flowchart of a method for receiving an emission profile corresponding to particular image frame data and determining, based on the emission profile, average pixel level or average pixel luminance of the electronic display, in accordance with an embodiment.

FIG. 12 is a flowchart of a method 1200 for receiving an emission profile (e.g., the emission profile 700) corresponding to particular image frame data and determining, based on the emission profile, average pixel level or average pixel luminance of the electronic display 12, according to an embodiment of the present disclosure. In process block 1202, the processor core complex 18 receives the emission profile for a current image frame. In process block 1204, the processor core complex 18 determines average pixel level or average pixel luminance for peak luminance control or IR drop loading compensation. The form of peak luminance control of this disclosure may limit pixel value (e.g., by limiting the current driven to the display pixels 54) to avoid overcurrent while enabling high peak brightness from the electronic display 12. Using the emission profile, the processor core complex 18 may increase or maximize the accuracy of the average pixel level or average pixel luminance calculation, which may enable finer-grain peak luminance control. Performing peak luminance control using emission profile tracking will be discussed in greater detail below.

As current is delivered to display pixels 54 across a display panel of the electronic display 12, internal resistance of conductors and components of the electronic display 12 may cause a drop in the voltage received by the display pixels 54; this may be referred to as IR drop. The average pixel level or average pixel luminance of a frame displayed on the electronic display 12 may affect the amount of current driven to the display pixels 54, and thus may affect the IR drop experienced by the display pixels 54. By using the emission profile to determine average pixel level or average pixel luminance, the processor core complex 18 may obtain a more accurate estimation of IR drop, and accordingly make a digital or analog adjustment to compensate for the IR drop.

Figure 13:
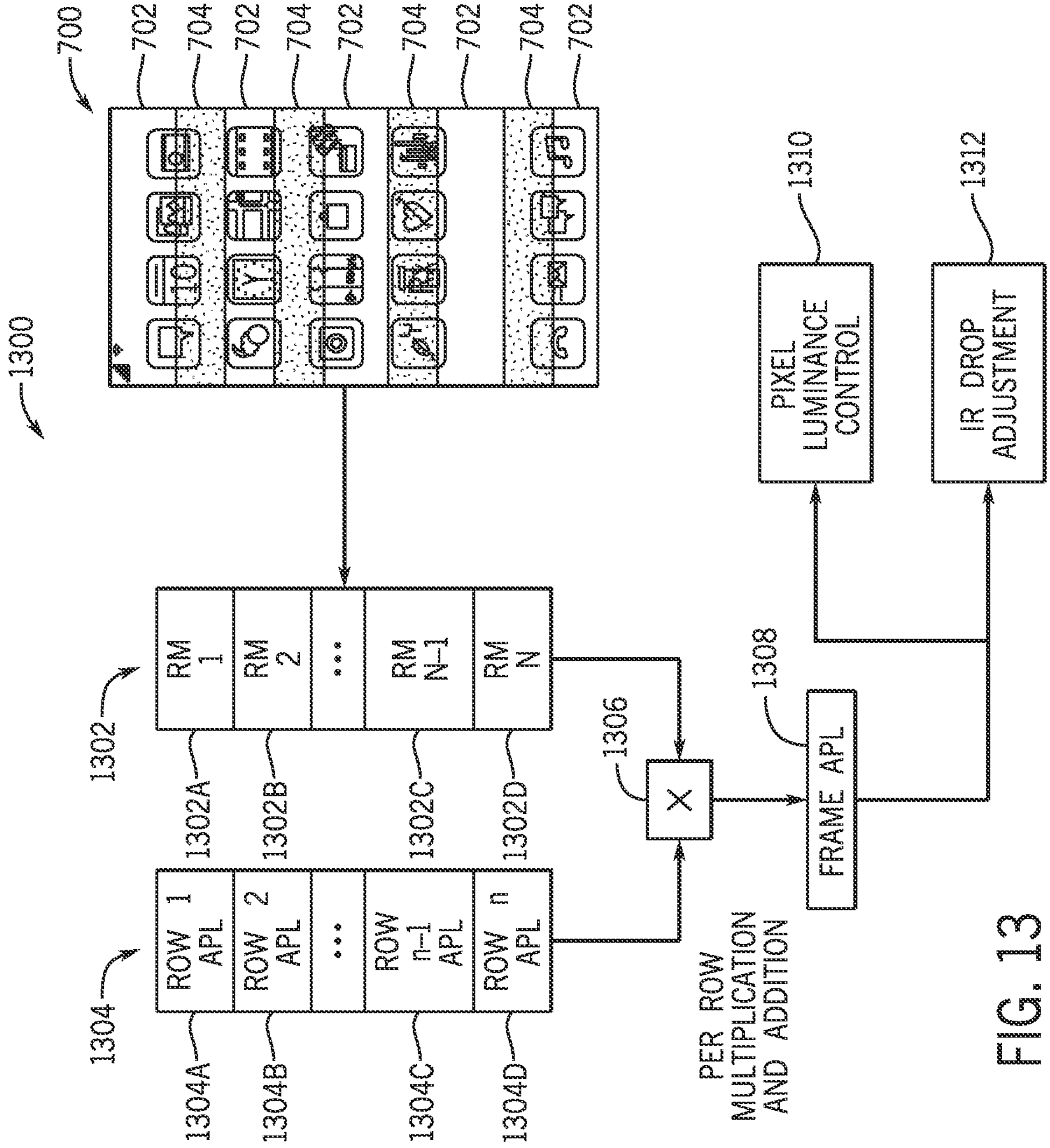
FIG. 13 is a diagram of an average pixel level or average pixel luminance calculation scheme used to determine frame average pixel level or average pixel luminance by determining the row average pixel level or average pixel luminance for each row based on a given emission profile, in accordance with an embodiment.

FIG. 13 is a diagram of an average pixel level or average pixel luminance calculation scheme 1300 used to determine frame average pixel level or average pixel luminance by determining the average pixel level or average pixel luminance for each row based on a given emission profile (e.g., the emission profile 700), according to an embodiment of the present disclosure. To calculate average pixel level or average pixel luminance of the frame, the processor core complex 18 may determine the emission profile applied to the electronic display 12 for a given frame (e.g., determine the location of the emission pulses and the emission masks). The processor core complex 18 may, based on the emission profile, determine the row mask value 1302 for each row of display pixels 54 in the electronic display 12. The row mask (RM) value 1302 indicates which rows of display pixels 54 are illuminated (e.g., are within the emission pulse) and which rows of display pixels 54 are deactivated (e.g., are within the emission mask). For example, the processor core complex 18 may determine that a first row of display pixels 54 (e.g., corresponding to row mask 1 (RM 1) 1302A) is within the emission pulse, and thus may set the value of RM 1 1302A to high (e.g., set to a binary 1). The processor core complex may determine that row 2 is also illuminated and likewise set RM 2 1302B high, while determining that rows N−1 and N are deactivated, and thus set RM N−1 1302C and RM N 1302D low (e.g., set to a binary 0).

The processor core complex 18 may determine the row average pixel level or average pixel luminance 1304 for each row of display pixels 54 in the electronic display. For example, the processor core complex 18 may determine row 1 row average pixel level or average pixel luminance 1304A, row 2 row average pixel level or average pixel luminance 1304B, row N−1 average pixel level or average pixel luminance 1304C, and row N average pixel level or average pixel luminance 1304D. In multiplication block 1306, the processor core complex 18 may multiply the row average pixel level or average pixel luminance 1304 of each row by the row mask value 1302 to determine the frame average pixel level or average pixel luminance 1308 of the electronic display 12 for a given frame and emission profile. The processor core complex 18 may use the frame average pixel level or average pixel luminance 1308 for pixel luminance control 1310 and/or IR drop adjustment 1312. Using the average pixel level or average pixel luminance calculation scheme 1300, the processor core complex 18 may repeat the row average pixel level or average pixel luminance calculation for each row each for each frame. For example, if the display pixel array 50 of the electronic display 12 has 2,000 rows of display pixels 54, for each frame, the row average pixel level or average pixel luminance 1304 may be calculated for all 2,000 rows.

Figure 14:
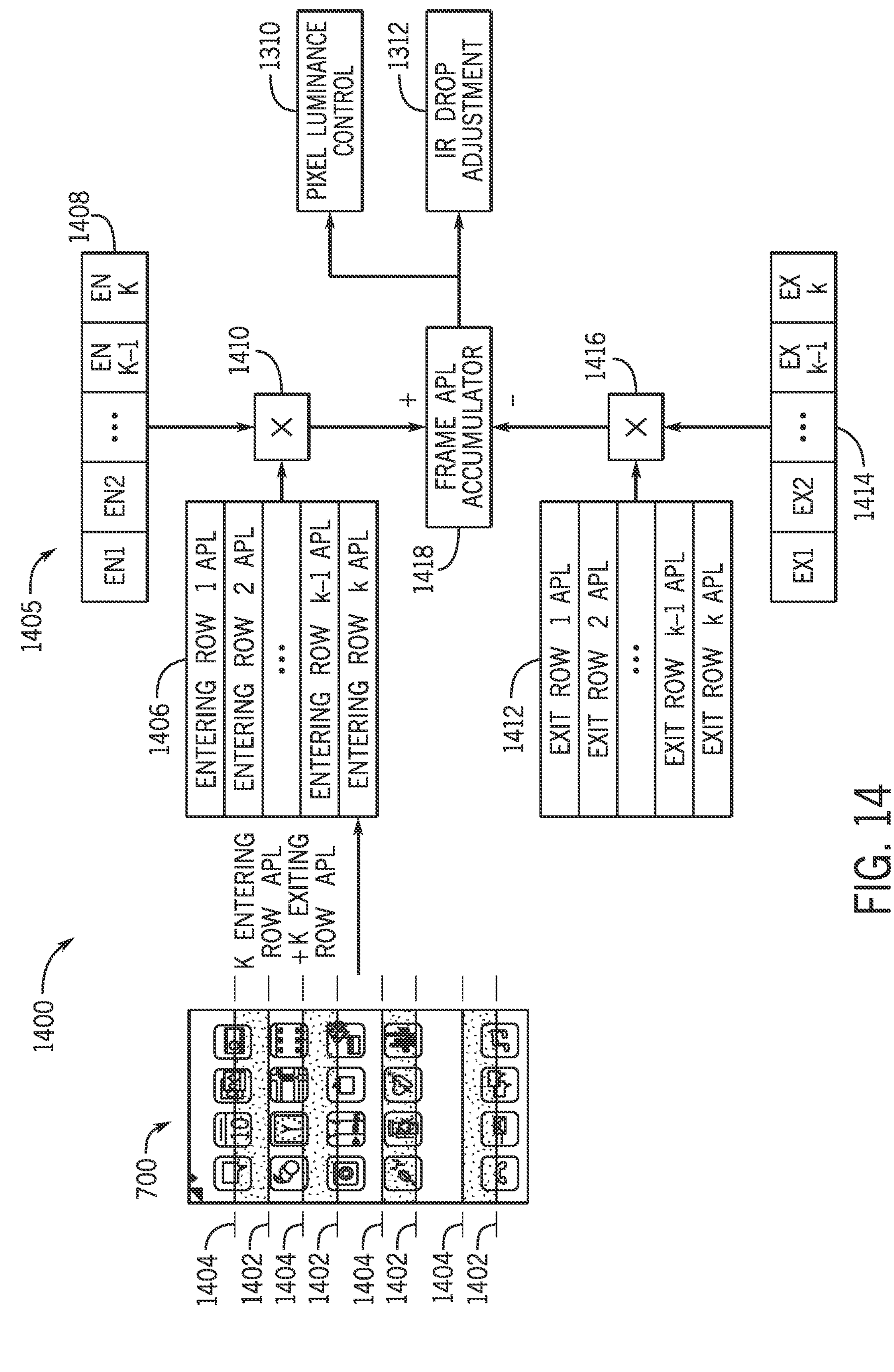
FIG. 14 is a diagram of an average pixel level or average pixel luminance calculation scheme used to determine the frame average pixel level or average pixel luminance using an emission profile tracking scheme, in accordance with an embodiment.

FIG. 14 is a diagram of an average pixel level or average pixel luminance calculation scheme 1400 used to determine the frame average pixel level or average pixel luminance 1308 using an emission profile tracking scheme, according to an embodiment of the present disclosure. Similarly to the average pixel level or average pixel luminance calculation scheme 1300 in FIG. 3, the average pixel level or average pixel luminance calculation scheme 1400 may include determining frame average pixel level or average pixel luminance 1308 for an initial frame by multiplying the row average pixel level or average pixel luminance 1304 of each row of display pixels 54 by the RM value 1302. However, the average pixel level or average pixel luminance calculation scheme 1400 may not necessarily recalculate the row average pixel level or average pixel luminance of each row to determine the frame average pixel level or average pixel luminance. Instead, the average pixel level or average pixel luminance calculation scheme 1400 may use an emission profile tracking scheme to identify the rows that experienced a change, and update the average pixel level or average pixel luminance calculation for those particular rows. In certain embodiments, as the old frame exits and the new frame enters the electronic display 12, the emission profile tracking scheme 1405 may, via an entering row counter 1408, track entering rows 1402 (e.g., rows that indicate the beginning of an emission pulse 702 and the end of the emission mask 704) and may track, via an exit row counter 1414, exit rows 1404 (e.g., rows that indicate the end of the emission pulse and the beginning of the emission mask 704) of the emission profile, and accumulate the entering row average pixel level or average pixel luminance 1406 for the entering rows 1402 and remove values accumulated for the exit row average pixel level or average pixel luminance 1412 for the exit rows 1404. Indeed, if the image frame is otherwise unchanged but for those entering rows that are now being illuminated and those exiting rows that are no longer being illuminated, the calculation may only add the entering rows and subtract the exiting rows to obtain the average pixel level or average pixel luminance.

For example, if the emission profile includes four pulses, there may be four areas of entering rows 1402 and four areas of exit rows 1404 (e.g., at least one row per area) and the display pixel array 50 of the electronic display 12. Initially, the row average pixel level or average pixel luminance 1304 may be calculated for all rows. However, upon entry of a new frame, the row average pixel level or average pixel luminance 1304 may be recalculated for the four areas of entering rows 1402 and the four areas of exit rows 1404, instead of for all 2,000 rows in the display pixel array 50. This may conserve processing power, energy, and memory, as the memory storage may only store data for 2*K rows (e.g., 2 counters and K is the number of pulses in the emission profile) instead of all rows.

At block 1410 the processor core complex 18 multiplies the entering row average pixel level or average pixel luminance 1406 for each entering row by a corresponding value of the entering row counter 1408 value. At block 1416, the processor core complex 18 multiplies the exit row average pixel level or average pixel luminance 1412 for each exit row by a corresponding value of the exit row counter 1414. The product of block 1410 is added to a frame average pixel level or average pixel luminance accumulator 1418 and the product of block 1416 is subtracted from the average pixel level or average pixel luminance accumulator 1418. As such, the frame average pixel level or average pixel luminance 1308 of the electronic device 10 is calculated by accounting for the entering rows 1402 and removing the exit rows 1404, as the exit rows 1404 are no longer illuminated. The frame average pixel level or average pixel luminance 1308 may then be used to assist in pixel luminance control 1310 and/or may be used to assist in IR drop adjustment 1312.

Figure 15:
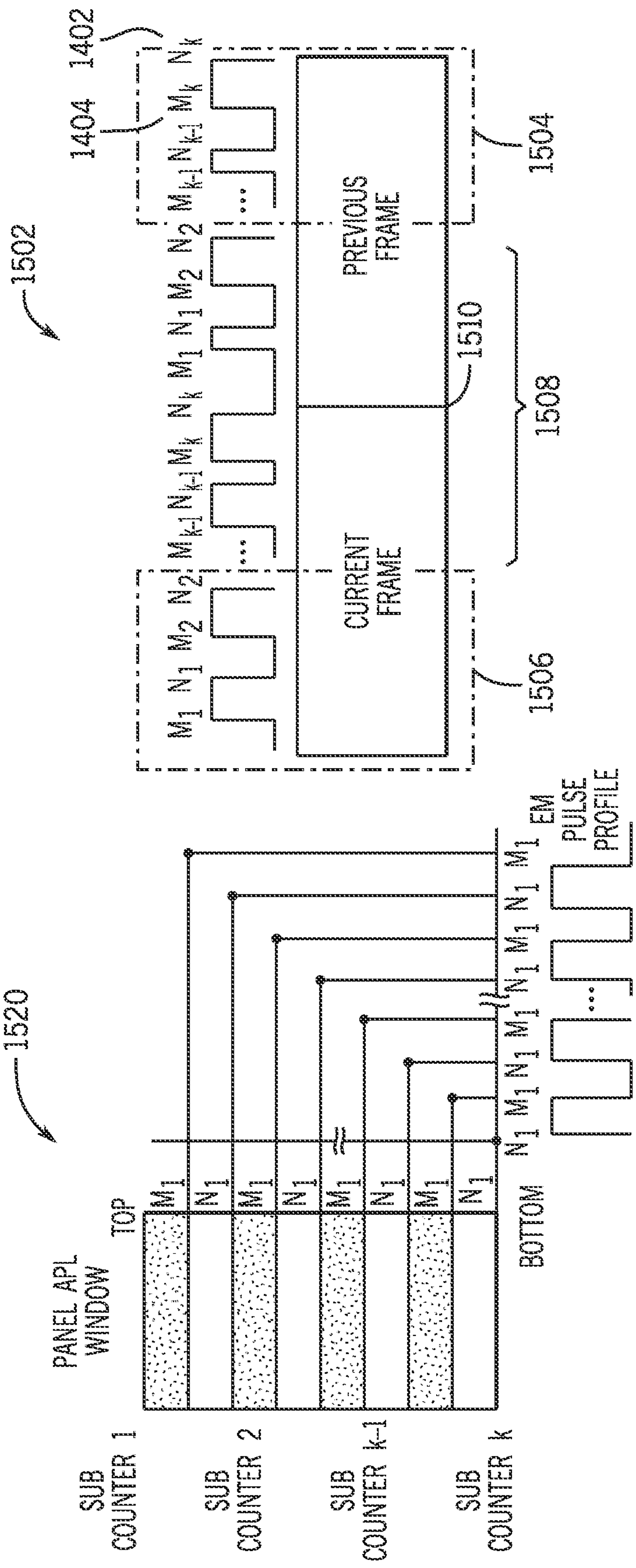
FIG. 15 includes a timing diagram and a graph illustrating entering rows and exiting rows as a previous frame exits the electronic display and a current frame enters the electronic display, in accordance with an embodiment.

FIG. 15 includes a timing diagram 1502 and a graph 1520 illustrating entering rows 1402 and exiting rows 1404 as a previous frame 1504 exits the electronic display 12 and a current frame 1506 enters the electronic display 12, according to an embodiment of the present disclosure. In the timing diagram 1502, the emission profile for the previous frame 1504 includes four pulses indicated by the four entering rows 1402 (e.g., $N'_K$, $N'_{K-1}$, $N'_2$, and $N'_1$) and the four exit rows 1404 (e.g., $M'_K$, $M'_{K-1}$, $M'_2$, and $M'_1$). Similarly, the current frame 1506 includes four pulses indicated by the four entering rows (e.g., $N_K$, $N_{K-1}$, $N_2$, and $N_1$) and the four exit rows 1404 (e.g., $M_K$, $M_{K-1}$, $M_2$, and $M_1$). 1508 represents the visible content of the electronic display 12. As may be observed, the final two pulses of the previous frame 1504 (e.g., $N'_2M'_2$, and $N'_1M'_1$) and the initial two pulses of the current frame 1506 are in the visible content 1508 of the electronic display 12. The graph 1520 illustrates the emission profile shown in the diagram 1502 as the emission profile relates to the entering row counters 1408 and the exit row counters 1414.

Figure 16:
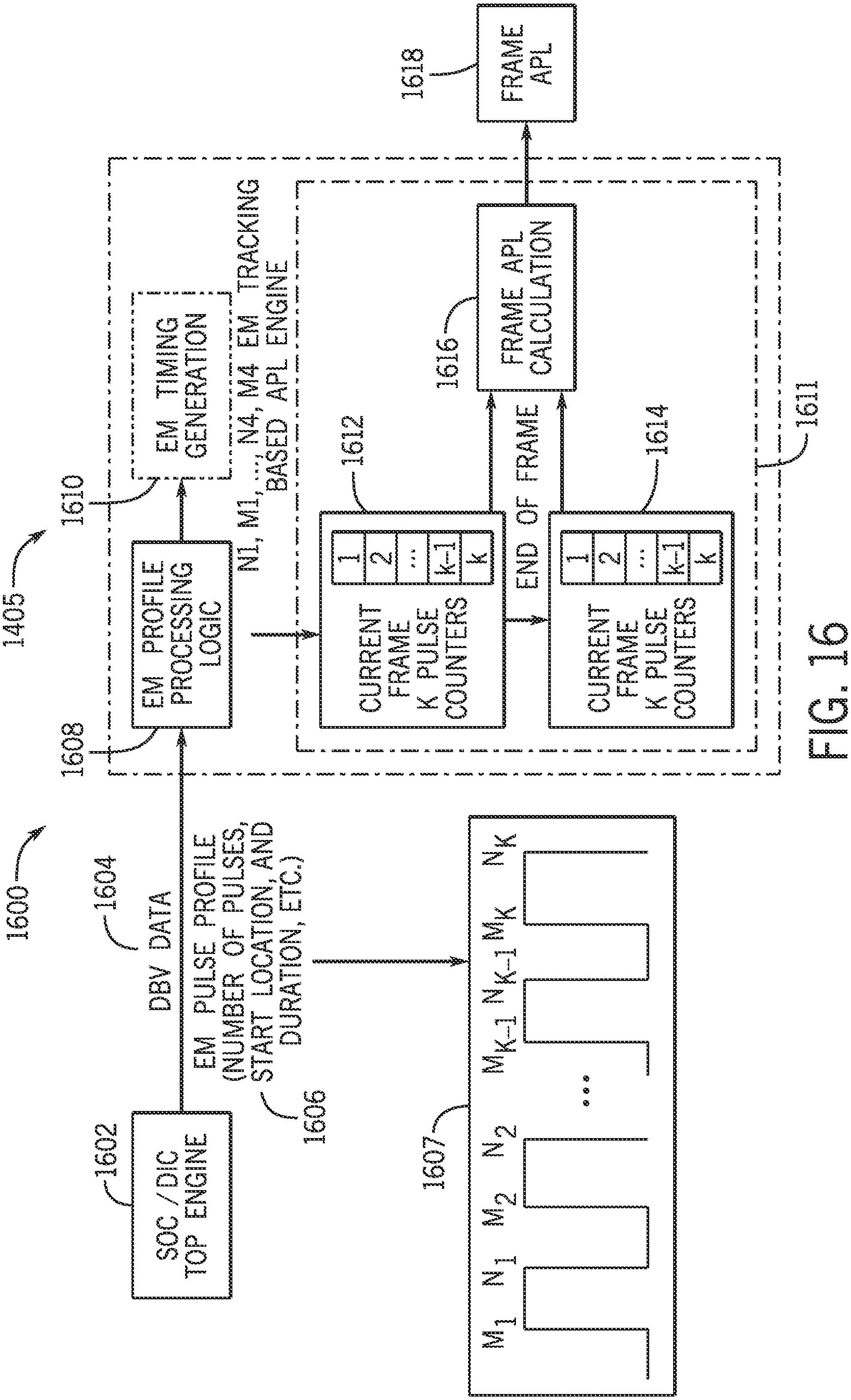
FIG. 16 is a diagram illustrating an overview of the emission profile tracking scheme, in accordance with an embodiment.

FIG. 16 is a diagram 1600 illustrating an overview of the emission profile tracking scheme 1405 described in FIGS. 14 and 15 according to an embodiment of the present disclosure. In FIG. 16, the system-on-a-chip (SOC) 1602 sends display brightness value (DBV) data 1604 and emission profile data 1606 to the emission profile tracking scheme 1405, where it is received by the emission profile processing logic 1608. The emission profile processing logic 1608 processes the DBV data 1604 and the emission profile data 1606 and sends the processed DBV data 1604 and the processed emission profile data 1606 to an emission timing generation engine 1610 and to an emission profile tracking based average pixel level or average pixel luminance engine 1611. A current frame pulse counter 1612 and a previous frame pulse counter 1614 use the processed DBV data 1604 and the processed emission profile data 1606 to track the pulses of the emission profile, and combine the tracked emission pulses with a frame average pixel level or average pixel luminance calculation 1616 to produce frame average pixel level or average pixel luminance 1618.

Average pixel level or average pixel luminance may be calculated by dividing a display panel into discrete regions. A current frame may be at the top of the display panel, a previous frame may be at the bottom of the display panel, and a current line may scan through the discrete regions of the display panel and update average pixel level or average pixel luminance values of the discrete regions, resulting in updated average pixel level or average pixel luminance values.

Figure 17:
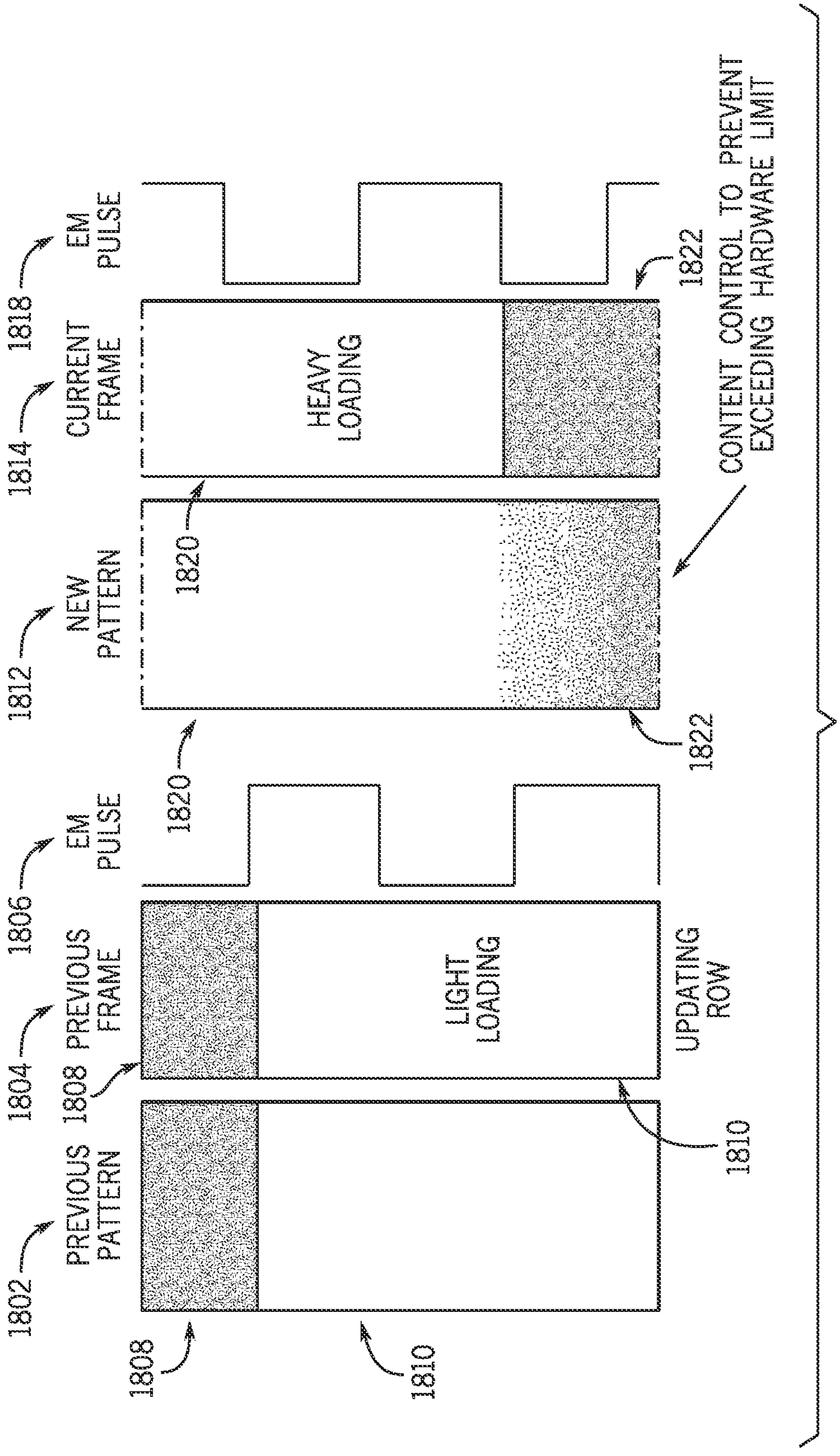
FIG. 17 is an example illustrating peak luminance control without the emission profile tracking scheme, in accordance with an embodiment.

FIG. 17 is an example illustrating peak luminance control (e.g., real-time peak luminance control) without the emission profile tracking scheme 1405, according to an embodiment of the present disclosure. As may be observed, the previous frame 1804 and corresponding previous luminance pattern 1802 begin at the top of the electronic display 12 with a dark section 1808 (e.g., display pixels 54 deactivated, little to no power consumed by this section), and has an illuminated section 1810 toward the bottom of the electronic display 12. The illuminated section 1810 consists of a light load (e.g., small amount of power consumed in order to illuminate the illuminated section 1810). In this scenario, peak luminance control may be superfluous and it may not be helpful to throttle the power provided to the pixels at the bottom of the electronic display 12, as the power consumed is not enough to exceed hardware limitations.

However, as the current frame 1814 and corresponding luminance pattern 1812 are displayed on the electronic display 12, the illuminated section 1820 consisting of a heavy load (e.g., large amount of power consumed in order to illuminate the illuminated section 1820) may cause excess power to be drawn in order to illuminate the illuminated section 1820. This may cause the peak luminance control to throttle the power consumed by the electronic display 12 in order to prevent the electronic display from exceeding hardware limitations. However, as the peak luminance control in FIG. 17 is not using emission profile tracking to track the emission pulses 1806 and 1818, the peak luminance control may not account for the dark section 1822 and may assume that the entire electronic display 12 is illuminated with the heavy load of the illuminated section 1820. As such, the peak luminance control may estimate when and where to throttle the power consumed by the electronic display, which may lead to unnecessary throttling before reaching the dark section 1822, which may negatively impact a viewing experience.

Figure 18:
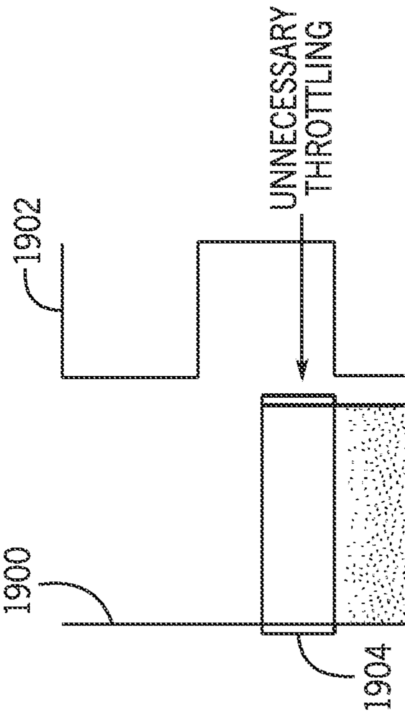
FIG. 18 is a diagram illustrating potentially excessive peak luminance control throttling in the electronic display, in accordance with an embodiment.

FIG. 18 illustrates unnecessary peak luminance control throttling in the electronic display 12, according to an embodiment of the present disclosure. Similarly to FIG. 17, the peak luminance control of FIG. 18 does not track emission pulses 1902 of the electronic display 12. As may be observed, the luminance pattern 1900 displayed on the electronic display 12 illuminates the top half of the electronic display 12 (e.g., the display pixels 54 are turned on, drawing power) while the bottom half is dark (e.g., display pixels 54 are turned off, drawing little to no power). The peak luminance control may determine the power consumed to illuminate the top half and may incorrectly assume that level of illumination will continue throughout the electronic display 12, and thus may exceed the power limitations of certain hardware components. Thus the peak luminance control may estimate a throttling location 1904 based on the load present in the illuminated sections of the electronic display 12, and throttle the power delivered to the bottom half of the display.

Figure 19:
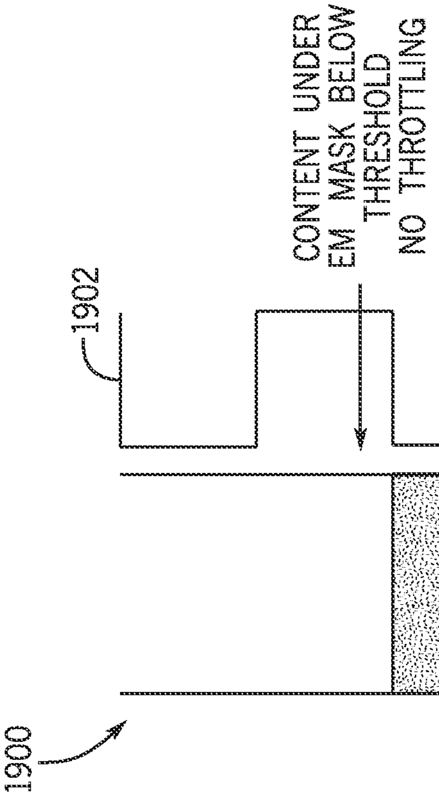
FIG. 19 is a diagram illustrating peak luminance control using the emission profile tracking scheme to decrease or avoid the potentially excessive peak luminance control throttling illustrated in FIG. 18, in accordance with an embodiment.

FIG. 19 illustrates peak luminance control using the emission profile tracking scheme 1405, according to an embodiment of the present disclosure. As may be observed, the luminance pattern 1900 still illuminates the top half of the electronic display 12 while the bottom half of the electronic display 12 remains dark. As the peak luminance control is tracking the emission pulses 1902, the peak luminance control receives accurate average pixel level or average pixel luminance information, and thus may determine that only the top half of the electronic display 12 is illuminated and drawing power while the bottom half of the electronic display 12 is dark and drawing little to no power. Based on this determination, the peak luminance control may determine that the electronic display 12 will not exceed power limitations, and thus will not perform any unnecessary throttling and may avoid the reduced viewing quality that may result from the unnecessary throttling.

Emission Tracking in Persistence Modes

Figure 20:
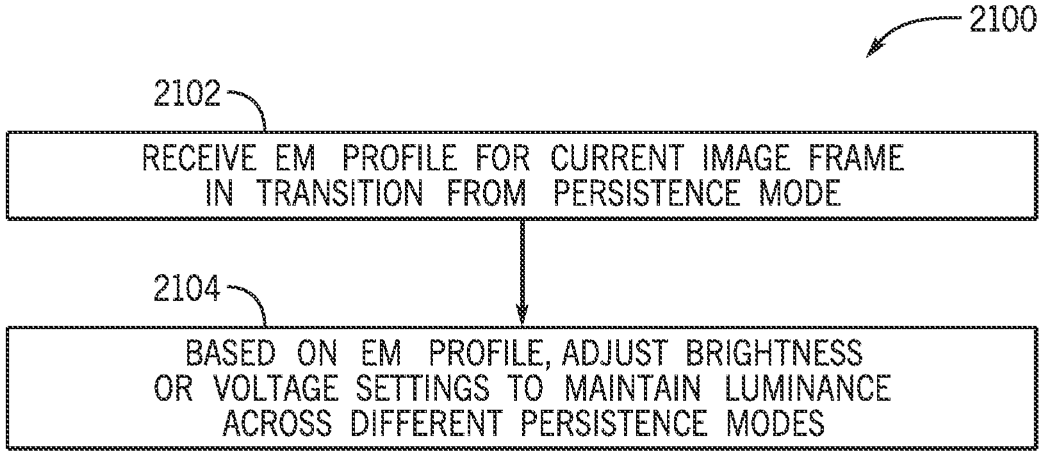
FIG. 20 is a flowchart of a method for receiving an emission profile for a current image frame in transition from a persistence mode and, based on the emission profile, adjusting brightness or voltage settings of the electronic display, in accordance with an embodiment.

FIG. 20 is a flowchart of a method 2100 for adjusting brightness or voltage settings to account for different emission profiles used in different persistence modes, including during transitions between different persistence modes. In process block 2102, the processor core complex 18 may receive the emission profile for a current image frame in transition from one persistence mode to another persistence mode. In process block 2104 the processor core complex 18 may, based on the emission profile, adjust brightness or voltage settings to improve persistence.

Figure 21:
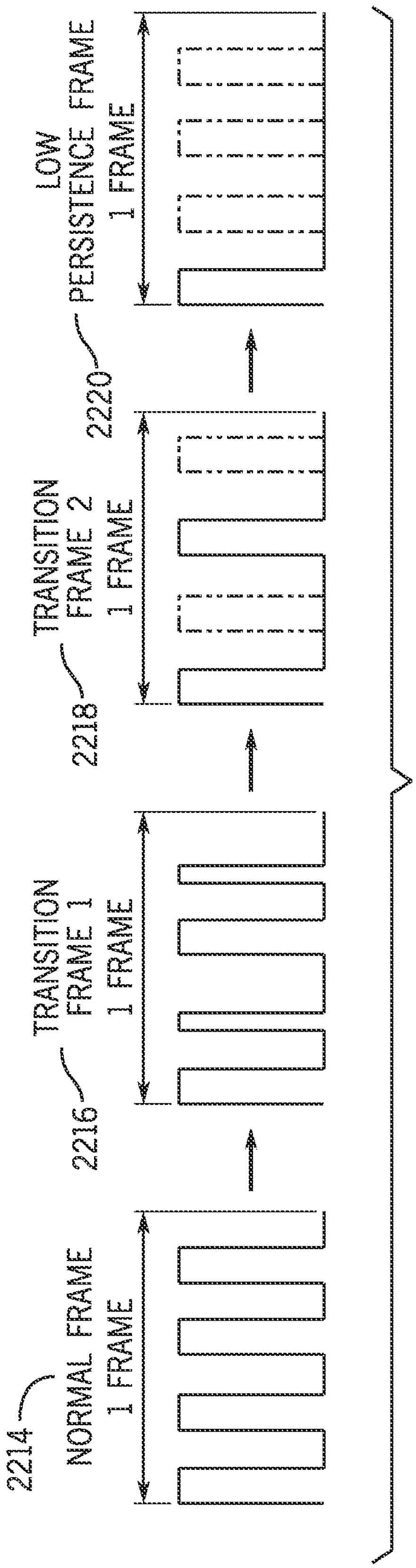
FIG. 21 is a diagram illustrating adjusting emission pulses to improve persistence, in accordance with an embodiment.

FIG. 21 is a diagram illustrating adjusting emission pulses (e.g., the emission pulses 702) to improve persistence, according to an embodiment of the present disclosure. In one particular example, a normal frame 2214 (e.g., a frame displayed under a high persistence condition) may include four emission pulses of even pulse-width per frame. A first transition frame 2216 may have four emission pulses 702. However, certain emission pulses (e.g., the second and fourth emission pulses in the first transition frame 2216) may be of a lower-pulse width in order to maintain image quality as the normal frame 2214 transitions to a low persistence condition. In a second transition frame 2218, certain emission pulses (e.g., the second and fourth emission pulses) may be removed, leaving only the first and third emission pulses in the emission profile. In the low persistence frame 2220, only the first emission pulse may be considered.

Figure 22:
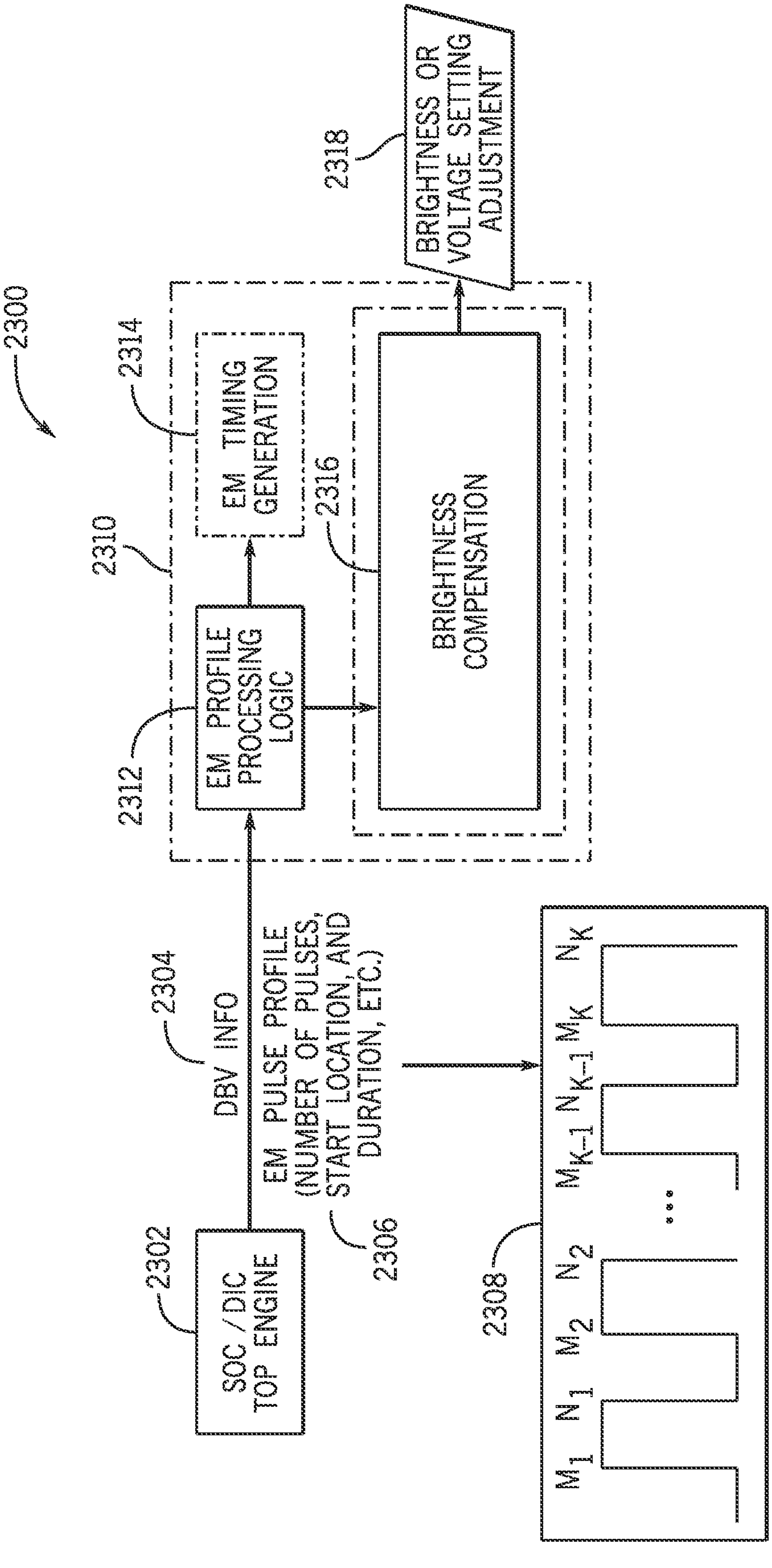
FIG. 22 is a diagram of a system for adjusting brightness or voltage settings of the electronic display, in accordance with an embodiment.

FIG. 22 is a diagram of a system 2300 for adjusting brightness or voltage settings as discussed in FIG. 20 and FIG. 21, according to an embodiment of the present disclosure. In FIG. 22, the system-on-a-chip (SOC) 2302 sends DBV data 2304 and emission profile data 2306 to the emission profile tracking scheme 2310, where it is received by the emission profile processing logic 2312. The emission profile processing logic 2312 processes the DBV data 2304 and the emission profile data 2306 and sends the processed DBV data 2304 and the processed emission profile data 2306 to an emission timing generation engine 2314 and to a brightness compensation engine 2316. In the brightness compensation engine 2316, the brightness of the electronic display 12 may be determined based on emission pulses 2308 of the emission profile, and the number of emission pulses 2308 may be adjusted, the pulse-widths of the emission pulses 2308 may be adjusted, or both. Based on the brightness compensation determined by the brightness compensation engine 2316, a brightness or voltage setting adjustment 2318 may be output to the electronic display 12.

Emission Tracking for Under-Display Sensing

Figure 23:
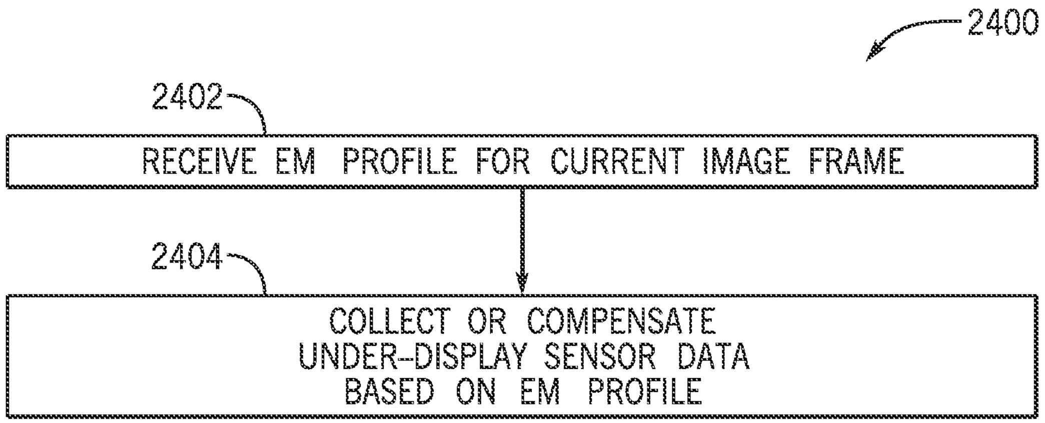
FIG. 23 is a flowchart of a method for receiving an emission profile for a current image frame and collecting or compensating under-display sensor data of an under-display sensor based on an emission profile, in accordance with an embodiment.

FIG. 23 is a flowchart of a method 2400 for receiving an emission profile (e.g., the emission profile 700) for a current image frame and collecting or compensating under-display sensor data based on the emission profile, according to an embodiment of the present disclosure. Sensors may be placed under the electronic display 12 for a variety of reasons. For example, an under-display sensor may include a touch sensor to enable touch control on a touchscreen-enabled display. An under-display sensor may also include a light sensor that senses ambient light and transmits ambient light data to the processor core complex 18. The processor core complex 18 may receive the measurement of ambient light data and adjust the brightness of the electronic display 12 accordingly. In process block 2402, the processor core complex 18 may receive the emission profile for a current image frame. In process block 2404, the processor core complex may compensate under-display sensor data based on the emission profile received by the processor core complex 18.

Figure 24:
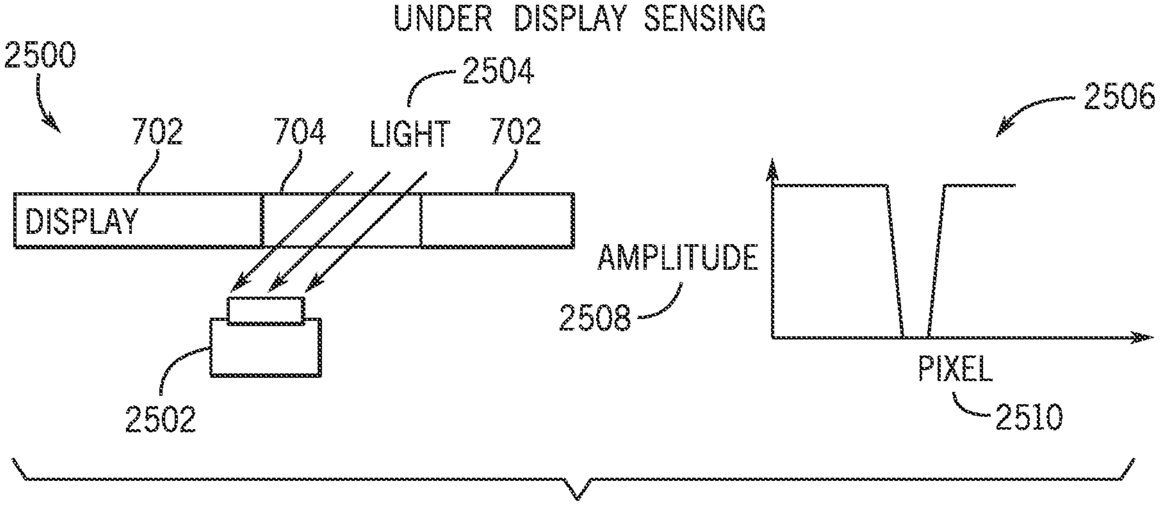
FIG. 24 is a diagram illustrating operation of the under-display sensor of FIG. 23, in accordance with an embodiment.

FIG. 24 is a diagram 2500 illustrating an under-display sensor (e.g., 2502) described above, according to an embodiment of the present disclosure. As previously stated, the under-display sensor 2502 may collect data on ambient light 2504. However, to reduce or avoid noise from illuminated display pixels and ensure the data collected is from the ambient light 2504, the under-display sensor 2502 may only collect data when the display pixels 54 above the under-display sensor 2502 are turned off (e.g., when the emission mask 704 is applied to the display pixels above the under-display sensor 2502). By tracking the emission pulses and the emission masks 704 of the emission profile, the processor core complex 18 may determine when the emission mask 704 is in a position such that the under-display sensor 2502 may collect data on the ambient light 2504 with reduced (e.g., minimal or no) noise from the display pixels 54 illuminated by the emission pulse 702.

The graph 2506 illustrates a model of desired amplitude 2508 of the emission pulse in relation to a pixel 2510 disposed above the under-display sensor 2502. The processor core complex 18 may, based on the emission profile received (e.g., as discussed in FIG. 23) determine the amplitude 2508 of the emission pulse may be at its greatest point furthest away from the pixel 2510 and reduces to zero or near-zero directly above the pixel 2510. When the amplitude 2508 of the emission pulse is at zero or near zero, the processor core complex 18 may send an activate signal to the under-display sensor 2502 disposed directly below the pixel 2510, such that the under-display sensor 2502 may collect data on the ambient light 2504 with little to no interference from an illuminated display pixel. As the processor core complex 18 determines that the amplitude 2508 of the emission pulse begins to increase, the processor core complex 18 may send a deactivate signal to the under-display sensor 2502, causing the under-display sensor to stop collecting data on the ambient light 2504.

Emission Tracking for Touch Sensor Noise Reduction or Compensation

Figure 25:
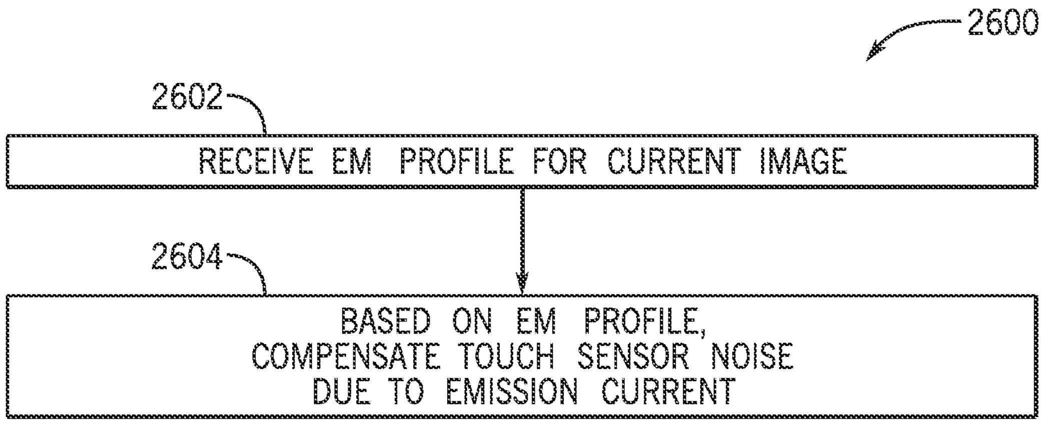
FIG. 25 is a flowchart of a method for receiving an emission profile for a current image frame and, based on the emission profile, compensating touch sensor noise due to emission current, in accordance with an embodiment.

FIG. 25 is a flowchart of a method 2600 for receiving an emission profile (e.g., the emission profile 700) for a current image frame and, based on the emission profile, compensating touch sensor noise due to emission current, according to an embodiment of the present disclosure. As previously discussed, an under-display sensor may include a touch sensor to enable touch control on a touchscreen-enabled display. Similarly to the under-display sensor 2502 discussed in FIG. 24, an under-display, in-display, or over-display touch sensor may experience noise due to an emission current that may be driven to a display pixel 54 to illuminate the display pixel 54. Such noise may lead to inaccurate touch sensing operation. The processor core complex 18 may receive the emission profile, and by tracking the emission pulses and emissions masks 704 of the emission profile, may determine a level of noise that may be experienced by the under-display touch sensor. Based on the determined noise experienced by the under-display touch sensor, the processor core complex 18 may determine a level of emission current noise compensation and account for the emission current noise compensation when sending a signal to the under-display touch sensor to mitigate interference associated with the emission current noise.

For example, if the processor core complex 18 determines, based on tracking the emission profile, that an emission pulse is occurring at the same region of the display that the touch sensor is currently sensing, the processor core complex 18 may apply a greater compensation due to the greater emission current and associated increase in risk of emission current noise. If the processor core complex 18 determines, based on tracking the emission profile, that an emission pulse is not occurring at the same region of the display that the touch sensor is currently sensing, the processor core complex 18 may apply a lesser compensation or no compensation due the decreased emission current or absence of emission current and thus due to the reduced risk of emission current noise.

Figure 26:
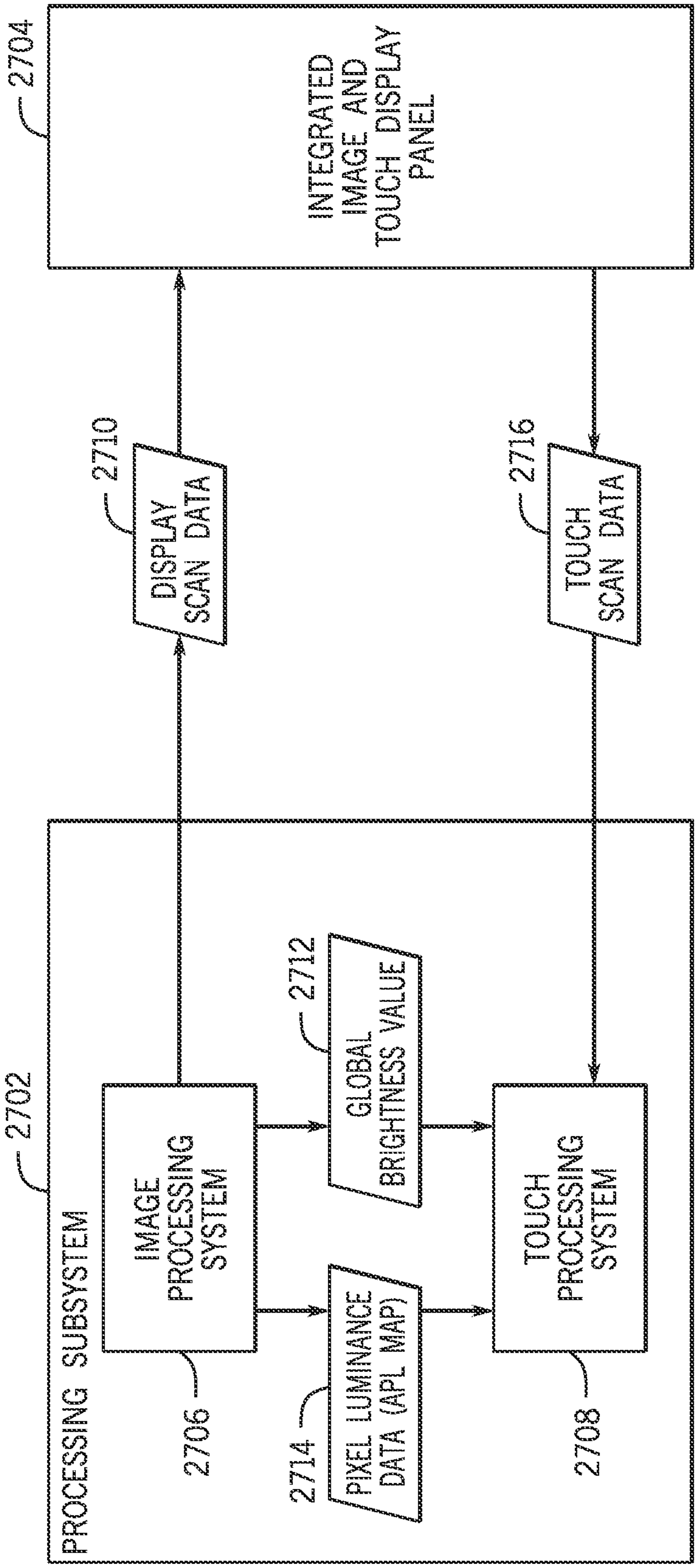
FIG. 26 is a block diagram of a portion of the electronic device, in accordance with an embodiment.

FIG. 26 is a block diagram of a portion of the electronic device 10. The electronic device 10 includes a processing subsystem 2702 and an integrated image and touch display 2704. The processing subsystem 2702 may represent the processor core complex 18 and may include an image processing system 2706 and a touch processing system 2708. The image processing system 2706 may receive image data and generate display scan data 2710 based on image processing operations and a global brightness value 2712.

The global brightness value 2712 may refer to an input received via manual or automated controls to brighten or dim the electronic display 12 perceived brightness at a global or display-panel wide adjustment level. The global brightness value 2712 may be associated with a defined gray level to luminosity relationship to associate a numerical gray level to a resulting light intensity emitted from the electronic display 12. For example, the global brightness value 2712 may reduce a luminosity of a 255 gray level such that a pixel driven with image data indicating a 255 gray level actually emits at a 50% of maximum intensity. Indeed, the global brightness value 2712 may trigger an image frame-wide brightness adjustment for a brightness permitted at a maximum gray level value.

The display scan data 2710 may include (e.g., be generated based on) indications of pixel luminance data 2714, such as indications of gray levels at which to operate one or more of the display pixels 54 of the integrated image and touch display 2704 transmitted as part of an average pixel level or average pixel luminance map (average pixel level or average pixel luminance map). In some systems, the image processing system 2706 may use one or more display pipelines, image processing operations, or the like, when processing the image data to generate the display scan data 2710. The image processing system 2706 may transmit the pixel luminance data 2714 and the global brightness value 2712 to the touch processing system 2708.

The integrated image and touch display 2704 may use the display scan data 2710 when generating control signals to cause the display pixels 54 to emit light. It may be desired for touch sensing operations to occur substantially simultaneous or perceivably simultaneously to the presentation of the image frames via the integrated image and touch display 2704. The touch sensing operations may generate touch scan data 2716, which the integrated image and touch display 2704 may transmit to the touch processing system 2708.

In some systems, the pixel luminance data 2714 may be averaged. Furthermore, the display scan data 2710 and/or the touch scan data 2716 may be handled on a row-by-row basis of a pixel map, such as a two-dimensional (2D) map (e.g., a vector of a computational matrix).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising:

an electronic display panel of an electronic display configured to display image data according to emission profiles;

processing circuitry configured to:

multiply an average pixel level or average pixel luminance of respective rows of the image data to be displayed on the electronic display with respect to elements of a mask defined according to one or more of the emission profiles;

accumulate the results to obtain an average pixel level or average pixel luminance of the image data to be displayed on the electronic display; and perform an operation related to the electronic display panel based at least in part on the accumulated results.

2. The electronic device of claim 1, wherein the processing circuitry is configured to compute the average pixel level or average pixel luminance of the image data to be displayed on the electronic display at least in part by accumulating an average pixel level or average pixel luminance of respective rows that are activated by a current emission profile of the emission profiles for a current image frame with respect to a previous emission profile of the emission profiles for a previous image frame.

3. The electronic device of claim 1, wherein the processing circuitry is configured to compute the average pixel level or average pixel luminance based at least in part on regional average pixel level or average pixel luminances corresponding to two-dimensional regions of the electronic display panel and the emission profiles.

4. The electronic device of claim 1, wherein the operation comprises peak luminance control of the electronic display panel, loading compensation of voltage drop of the electronic display panel, or a combination thereof.

5. A method comprising:

receiving an emission profile corresponding to an image frame to be displayed on an electronic display;

multiplying an average pixel level or average pixel luminance of respective rows of image data to be displayed on the electronic display with respect to elements of a mask defined according to one or more of the emission profiles;

accumulating the results to obtain an average pixel level or average pixel luminance of the image data to be displayed on the electronic display; and performing an operation involving the electronic display based at least in part on the emission profile.

6. The method of claim 5, comprising computing the average pixel level or average pixel luminance of the image data to be displayed on the electronic display at least in part by accumulating an average pixel level or average pixel luminance of respective rows that are activated by a present emission profile of the emission profiles associated with a present image frame with respect to a previous emission profile of the emission profile associated with a previous image frame.

7. The method of claim 5, comprising computing the average pixel level or average pixel luminance based at last in part on regional average pixel level or average pixel luminance corresponding to two-dimensional regions of the electronic display and the emission profiles.

8. The method of claim 5, wherein the operation comprises peak luminance control of the electronic display, loading compensation of voltage drop of the electronic display, or a combination thereof.

9. Tangible, non-transitory, and computer-readable media, comprising instructions that, when executed, cause one or more processors to:

generate image data for an electronic display;

generate one or more emission profiles for the electronic display;

multiply an average pixel level or average pixel luminance of respective rows of the image data to be displayed on the electronic display with respective elements of a mask defined according to the one or more emission profiles;

accumulate the results to obtain an average pixel level or average pixel luminance of the image data to be displayed on the electronic device; and perform an operation relating to the electronic display based on the one or more emission profiles.

10. The tangible, non-transitory, computer-readable media of claim 9, wherein accumulating the results comprises accumulating the average pixel level or average pixel luminance of the respective rows that are activated by a present emission profile of the one or more emission profiles for a present image frame with respect to a previous emission profile of the one or more emission profiles for a previous image frame.

11. The electronic device of claim 1, wherein the processing circuitry is disposed at least partially within the electronic display panel or at least partially outside of the electronic display panel.

12. The electronic device of claim 1, wherein the processing circuitry is configured to adjust a brightness setting or voltage setting of the electronic display panel over a period to account for a change in the emission profiles over the period that increase or reduce a total area illuminated per image frame.

13. The electronic device of claim 12, wherein the processing circuitry is configured to increase the brightness setting or voltage setting of the electronic display panel in response to the emission profiles over the period changing to reduce the total area illuminated per image frame.

14. The electronic device of claim 12, wherein the processing circuitry is configured to reduce the brightness setting or voltage setting of the electronic display panel in response to the emission profiles over the period changing to increase the total area illuminated per image frame.

15. The electronic device of claim 1, wherein the processing circuitry is configured to:

determine whether a region of the electronic display is not emitting light based at least in part on one of the emission profiles, wherein the region of the electronic display panel at least partly covers an under-display sensor; and in response to determining that the region of the electronic display panel is not emitting light, collect under-display sensor data.

16. The electronic device of claim 1, wherein the processing circuitry is configured to receive touch sensor data and compensate the touch sensor data for noise based at least in part on the emission profiles.

17. The method of claim 5, wherein the operation comprises real-time peak luminance control or voltage drop loading compensation based at least in part on an average pixel level or average pixel luminance determined in accordance with the emission profile.

18. The method of claim 5, wherein the operation comprises adjusting the emission profile to improve persistence.

19. The method of claim 5, comprising collecting or compensating under-display sensor data based at least in part on the emission profile.

20. The method of claim 5, comprising compensating touch sensor data to account for noise due to emission indicated by the emission profile.

* * * * *